(12) United States Patent
Zheng

(10) Patent No.: US 10,560,594 B2
(45) Date of Patent: *Feb. 11, 2020

(54) IMAGE SCANNING APPARATUS, AND METHOD AND COMPUTER-READABLE MEDIUM THEREFOR

(71) Applicant: BROTHER KOGYO KABUSHIKI KAISHA, Nagoya, Aichi (JP)

(72) Inventor: Jie Zheng, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,301

(22) Filed: Aug. 15, 2019

(65) Prior Publication Data

US 2019/0373132 A1 Dec. 5, 2019

Related U.S. Application Data

(63) Continuation of application No. 15/910,207, filed on Mar. 2, 2018, now Pat. No. 10,389,903.

(30) Foreign Application Priority Data

Mar. 17, 2017 (JP) .................................. 2017-052335

(51) Int. Cl.
*H04N 1/00* (2006.01)
*H04N 1/407* (2006.01)

(52) U.S. Cl.
CPC ......... *H04N 1/00997* (2013.01); *H04N 1/407* (2013.01)

(58) Field of Classification Search
CPC .......................... H04N 1/00997; H04N 1/407
See application file for complete search history.

(56) References Cited

U.S. PATENT DOCUMENTS

| 6,424,748 B1 * | 7/2002 | Ting-Shan | .............. H04N 1/401 358/461 |
| 2005/0134937 A1 * | 6/2005 | Cholewo | .............. H04N 1/4076 358/461 |

FOREIGN PATENT DOCUMENTS

| JP | 2009-135730 A | 6/2009 |
| JP | 2012-074834 A | 4/2012 |

OTHER PUBLICATIONS

Notice of Allowance dated Apr. 4, 2019 issued in U.S. Appl. No. 15/910,207.

\* cited by examiner

*Primary Examiner* — Ibrahim Siddo
(74) *Attorney, Agent, or Firm* — Scully, Scott, Murphy & Presser, PC

(57) ABSTRACT

An image scanning apparatus includes a controller configured to perform a light quantity adjustment determining process to determine whether a detection light quantity needs to be adjusted, based on adjustment determination values, in a black-white detectable position, a light quantity adjusting process to adjust the detection light quantity to maximize an adjustment difference value between a gradation value generated by scanning a white portion of a reference member and a gradation value generated by scanning a black portion of the reference member, a threshold calculating process to calculate a detection threshold based on a black value and a white value, and a reference position detecting process to detect a reference position by comparing, with the detection threshold, gradation values generated by scanning the reference member while illuminating the reference member with the detection light quantity.

20 Claims, 13 Drawing Sheets

IMAGE SCANNING APPARATUS, AND METHOD AND COMPUTER-READABLE MEDIUM THEREFOR

CROSS-REFERENCE TO RELATED APPLICATION

This application is a continuation of U.S. Ser. No. 15/910,207 filed on Mar. 2, 2018 and claims priority under 35 U.S.C. § 119 from Japanese Patent Application No. 2017-052335 filed on Mar. 17, 2017. The entire subject matter of each application is incorporated herein by reference.

BACKGROUND

Technical Field

Aspects of the present disclosure are related to an image scanning apparatus, and a method and a computer-readable medium therefor.

Related Art

As a technique for an image scanning apparatus to perform document scanning while moving an image sensor, it has been known setting a home position as a reference position for the image sensor by scanning a reference mark.

For instance, an image scanning apparatus has been known that is configured to detect a white area and a black area of a reference mark by comparing, with a black-white discrimination value, a difference value obtained by subtracting a black output value acquired by scanning the black area from an output value.

SUMMARY

A secular change of the known apparatus may cause a reduction in the quantity of light emitted by the light source of the image sensor. Further, the secular change of the known apparatus may cause color degradation of the black area of the reference mark. In such a case, an output value from the image sensor when scanning the white area of the reference mark might decrease due to the reduction in the light quantity of the light source. Even in this case, the black-white discrimination value may be previously set smaller to detect the white area and the black area of the reference mark.

However, the black area of the reference mark is lighter in color than before due to its color degradation. Hence, when the black-white discrimination value is previously set smaller, the known apparatus might be unable to detect the black area of the reference mark.

Aspects of the present disclosure are advantageous to provide one or more techniques, for an image scanning apparatus, which make it possible to detect a reference member having a white portion and a black portion, even though an output value from an image scanner when scanning the white area decreases due to a secular change of a light source of the image scanner, and an output value from the image scanner when scanning the black area increases due to color degradation of the reference member.

According to aspects of the present disclosure, an image scanning apparatus is provided, which includes an image scanner including a light source and a light receiver, the light receiver including light receiving elements arranged in line along a main scanning direction, the image scanner being configured to illuminate a scanned target with light emitted by the light source and receive reflected light from the scanned target by the light receiver, thereby generating gradation values, a mover configured to move the image scanner along a sub scanning direction perpendicular to the main scanning direction, a reference member including a black portion, a white portion, and a black-white boundary between the black portion and the white portion, a position of the black-white boundary being a reference position for the image scanner in the main scanning direction or the sub scanning direction, a storage configured to store a detection light quantity, the detection light quantity being a quantity of light to be emitted by the light source to detect the reference position, and a controller. The controller is configured to perform a light quantity adjustment determining process to determine whether the detection light quantity needs to be adjusted, based on adjustment determination values, the adjustment determination values being gradation values generated when the image scanner illuminates the reference member with the detection light quantity in a black-white detectable position, the black-white detectable position being a position in the sub scanning direction where the image scanner faces the black portion and the white portion, a light quantity adjusting process including adjusting, in response to determining that the detection light quantity needs to be adjusted, the detection light quantity to maximize an adjustment difference value, the adjustment difference value being a difference between a gradation value generated when the image scanner scans the white portion while illuminating the reference member in the black-white detectable position and a gradation value generated when the image scanner scans the black portion while illuminating the reference member in the black-white detectable position, and storing the adjusted detection light quantity into the storage, a threshold calculating process to calculate a detection threshold based on a black value and a white value, the black value being a gradation value generated when the image scanner scans the black portion, the white value being a gradation value generated when the image scanner scans the white portion, and a reference position detecting process to, while moving the image scanner along the sub scanning direction by the mover, detect the reference position by comparing, with the detection threshold, gradation values generated when the image scanner scans the reference member while illuminating the reference member with the detection light quantity stored in the storage.

According to aspects of the present disclosure, further provided is a method implementable on a processor coupled with an image scanning apparatus. The image scanning apparatus includes an image scanner including a light source and a light receiver, the light receiver including light receiving elements arranged in line along a main scanning direction, the image scanner being configured to illuminate a scanned target with light emitted by the light source and receive reflected light from the scanned target by the light receiver, thereby generating gradation values, a mover configured to move the image scanner along a sub scanning direction perpendicular to the main scanning direction, a reference member including a black portion, a white portion, and a black-white boundary between the black portion and the white portion, a position of the black-white boundary being a reference position for the image scanner in the main scanning direction or the sub scanning direction, and a storage configured to store a detection light quantity, the detection light quantity being a quantity of light to be emitted by the light source to detect the reference position. The method includes determining whether the detection light quantity needs to be adjusted, based on adjustment determination values, the adjustment determination values being gradation values generated when the image scanner illuminates the reference member with the detection light quantity in a black-white detectable position, the black-white detectable position being a position in the sub scanning direction where the image scanner faces the black portion and the white portion, adjusting, in response to determining that the detection light quantity needs to be adjusted, the detection light quantity to maximize an adjustment difference value, the adjustment difference value being a difference between a gradation value generated when the image scanner scans the white portion while illuminating the reference member in the black-white detectable position and a gradation value generated when the image scanner scans the black portion while illuminating the reference member in the black-white detectable position, storing the adjusted detection light quantity into the storage, calculating a detection threshold based on a black value and a white value, the black value being a gradation value generated when the image scanner scans the black portion, the white value being a gradation value generated when the image scanner scans the white portion, and detecting, while moving the image scanner along the sub scanning direction by the mover, the reference position by comparing, with the detection threshold, gradation values generated when the image scanner scans the reference member while illuminating the reference member with the detection light quantity stored in the storage.

According to aspects of the present disclosure, further provided is a non-transitory computer-readable medium storing computer-readable instructions that are executable by a processor coupled with an image scanning apparatus. The image scanning apparatus includes an image scanner including a light source and a light receiver, the light receiver including light receiving elements arranged in line along a main scanning direction, the image scanner being configured to illuminate a scanned target with light emitted by the light source and receive reflected light from the scanned target by the light receiver, thereby generating gradation values, a mover configured to move the image scanner along a sub scanning direction perpendicular to the main scanning direction, a reference member including a black portion, a white portion, and a black-white boundary between the black portion and the white portion, a position of the black-white boundary being a reference position for the image scanner in the main scanning direction or the sub scanning direction, and a storage configured to store a detection light quantity, the detection light quantity being a quantity of light to be emitted by the light source to detect the reference position. The instructions are configured to, when executed by the processor, cause the processor to perform a light quantity adjustment determining process to determine whether the detection light quantity needs to be adjusted, based on adjustment determination values, the adjustment determination values being gradation values generated when the image scanner illuminates the reference member with the detection light quantity in a black-white detectable position, the black-white detectable position being a position in the sub scanning direction where the image scanner faces the black portion and the white portion, a light quantity adjusting process including adjusting, in response to determining that the detection light quantity needs to be adjusted, the detection light quantity to maximize an adjustment difference value, the adjustment difference value being a difference between a gradation value generated when the image scanner scans the white portion while illuminating the reference member in the black-white detectable position and a gradation value generated when the image scanner scans the black portion while illuminating the reference member in the black-white detectable position, and storing the adjusted detection light quantity into the storage, a threshold calculating process to calculate a detection threshold based on a black value and a white value, the black value being a gradation value generated when the image scanner scans the black portion, the white value being a gradation value generated when the image scanner scans the white portion, and a reference position detecting process to, while moving the image scanner along the sub scanning direction by the mover, detect the reference position by comparing, with the detection threshold, gradation values generated when the image scanner scans the reference member while illuminating the reference member with the detection light quantity stored in the storage.

BRIEF DESCRIPTION OF THE ACCOMPANYING DRAWINGS

FIG. 1 schematically shows an internal configuration of an image scanning apparatus in an illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<Configuration of Image Scanning Apparatus>

Figure 1:
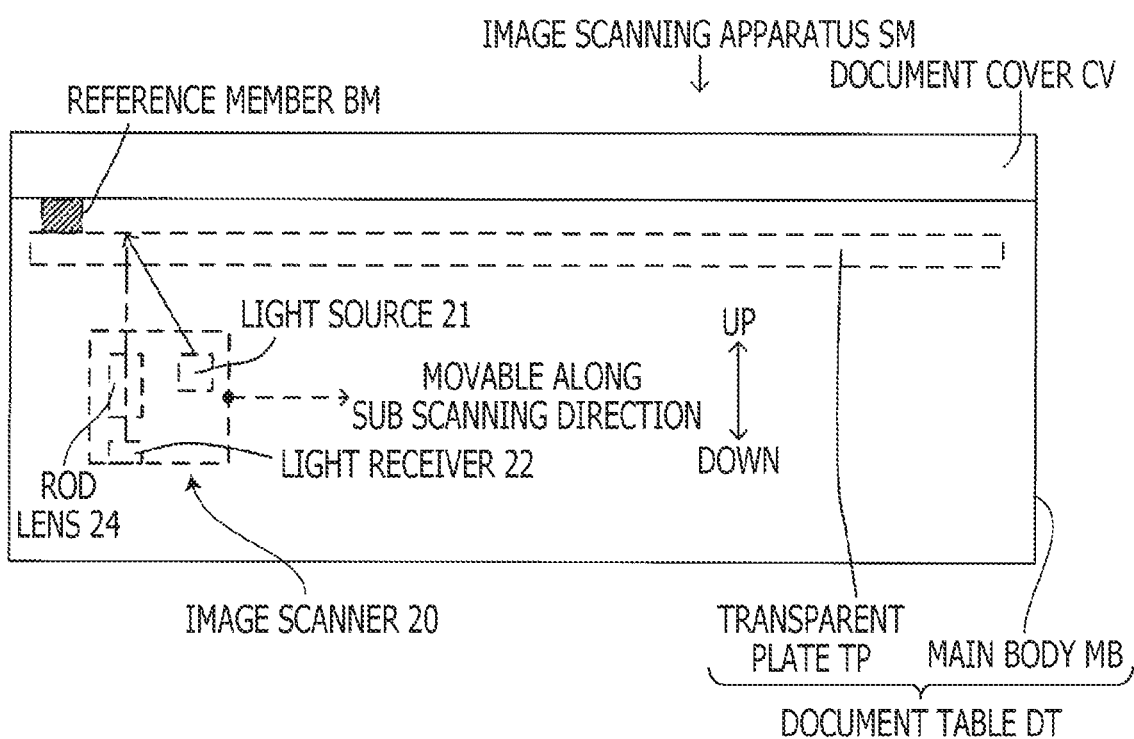
Figure 2:
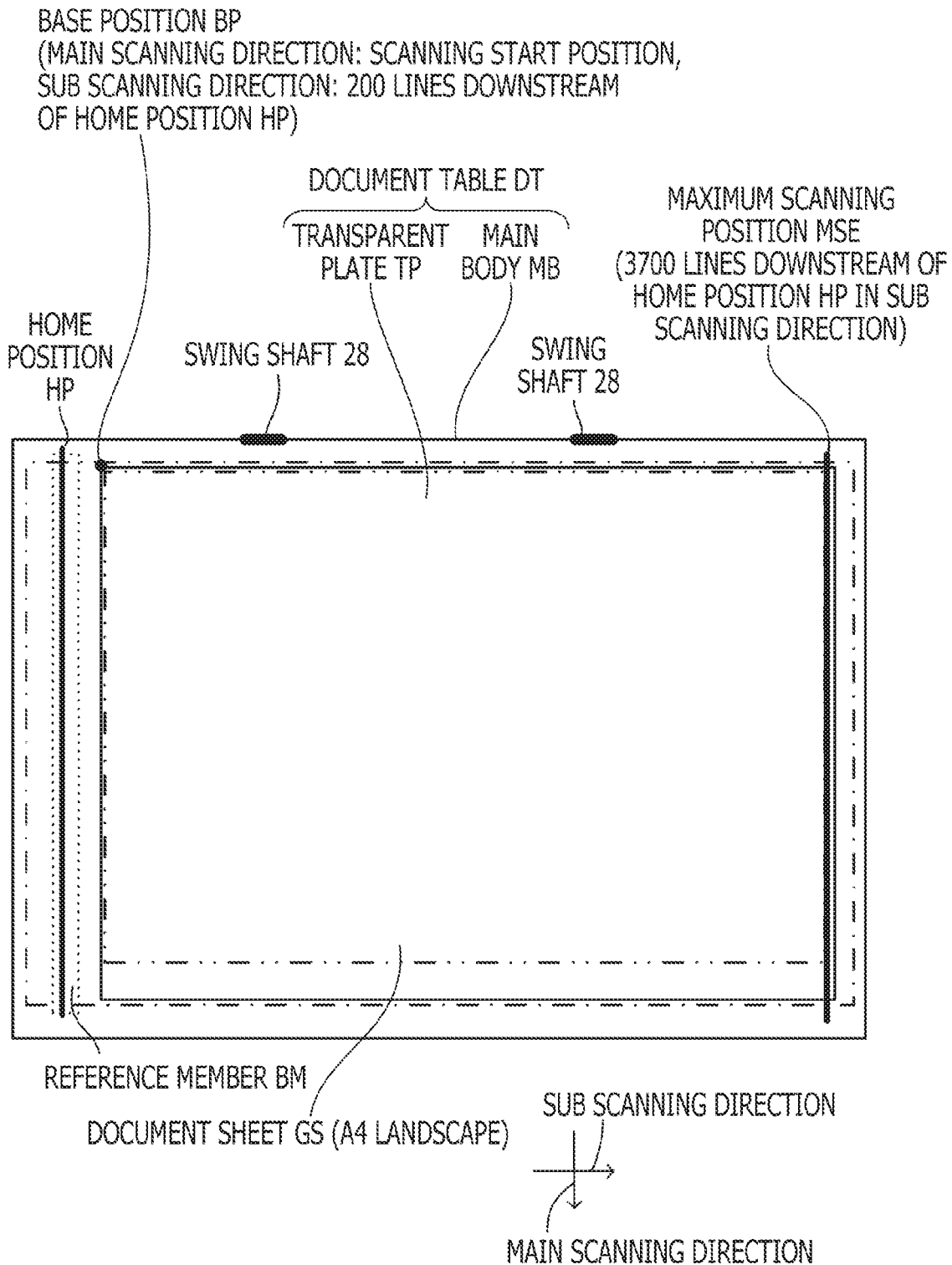
FIG. 2 is a plane view of a document table of the image scanning apparatus in the illustrative embodiment according to one or more aspects of the present disclosure.

FIG. 1 is a front view of an image scanning apparatus SM according to aspects of the present disclosure. FIG. 2 is a plane view of a document table DT. It is noted that in the following description, a right-hand side in FIG. 1 will be defined as a downstream side in a sub scanning direction. A lower side in FIG. 2 will be defined as a downstream side in a main scanning direction. A right-hand side in FIG. 2 will be defined as a downstream side in the sub scanning direction. The image scanning apparatus SM includes the document table DT and a document cover CV. The document table DT includes a main body MB and a transparent plate TP. The main body MB is configured to accommodate various members (e.g., the transparent plate TP and an image scanner 20). The transparent plate TP is disposed inside the main body MB and fixedly attached to the main body MB. The transparent plate TP is configured to support a document sheet placed thereon. The document cover CV is disposed above the main body MB. The document cover CV is openable and closable relative to the main body MB. The document cover CV includes swing shafts 28 disposed at a rear end portion (i.e., a far side portion in a direction perpendicular to a flat surface of FIG. 1, and an upper end portion in FIG. 2) of the main body MB. The document cover CV is configured to swing around the swing shafts 28 so as to be opened and closed from a front end (i.e., a near side portion in the direction perpendicular to the flat surface of FIG. 1, and a lower end portion in FIG. 2) of the main body MB.

The image scanning apparatus SM further includes the image scanner 20. The image scanner 20 is disposed below the transparent plate TP, inside the main body MB. The image scanner 20 is movable along the sub scanning direction (i.e., the left-to-right direction in FIG. 1) relative to the main body MB. The image scanner 20 is configured to scan an image of a document sheet placed on the transparent plate TP. The image scanner 20 includes a CIS ("CIS" is an abbreviated form of "contact image sensor"). More specifically, the image scanner 20 includes a light source 21, a rod lens 24, and a light receiver 22. The light source 21 includes at least a green LED ("LED" is an abbreviated form of "light-emitting diode"). The light source 21 is configured to emit light toward the transparent plate TP. The rod lens 24 is configured to receive reflected light of the light emitted by the light source 21.

The light receiver 22 includes 2592 photoelectric conversion elements 23 arranged along the main scanning direction. The light receiver 22 further incorporates therein a shift register (not shown) and an amplifier (not shown). An output from each photoelectric conversion element 23 corresponds to a quantity of light received by each of pixels arranged along the main scanning direction. A head pixel of the photoelectric conversion elements 23 is a pixel positioned upstream of any other pixels in the main scanning direction shown in FIG. 2. A final pixel of the photoelectric conversion elements 23 is a pixel positioned downstream of any other pixels in the main scanning direction shown in FIG. 2. In the illustrative embodiment, a single line is a pixel group including a plurality of pixels from the head pixel to the final pixel. An interval between each two of mutually-adjacent lines in the sub scanning direction is 300 DPI. An interval between each two of mutually-adjacent photoelectric conversion elements 23 in the main scanning direction is 300 DPI.

As shown in FIG. 2, an upper surface of the document table DT includes an upper surface of the main body MB and an upward-exposed surface of the transparent plate TP. The upward-exposed surface of the transparent plate TP is exposed toward the document cover CV. The swing shafts 28 are disposed at the main body MB. The transparent plate TP is indicated by an alternate long and short dash line in FIG. 2. The transparent plate TP is formed in a rectangular shape having long sides along the sub scanning direction and short sides along the main scanning direction. The upward-exposed surface of the transparent plate TP is indicated by a solid line in FIG. 2. The most upstream position of the upward-exposed surface of the transparent plate TP in both the main scanning direction and the sub scanning direction is a base position BP. The base position BP is a reference position in the main scanning direction, and is a reference position in the sub scanning direction. In the main scanning direction, the base position BP is a below-mentioned scanning start position RSP. In the sub scanning direction, the base position BP is located 200 lines downstream of a below-mentioned home position HP. The most downstream position of the upward-exposed surface of the transparent plate TP in the sub scanning direction is a maximum scanning position MSE. The maximum scanning position MSE is located 3700 lines downstream of the below-mentioned home position HP in the sub scanning direction. On the transparent plate TP, a document sheet GS is placed with the base position BP as a reference point. In FIG. 2, a state where an A4-size document sheet GS is placed with a longitudinal direction thereof along the sub scanning direction is shown by an alternate long and two short dashes line. The swing shafts 28 are configured to rotate when the document cover CV is opened and closed. The two swing shafts 28 are disposed at two places at an upstream end portion of the main body MB in the main scanning direction, respectively.

Figure 3:
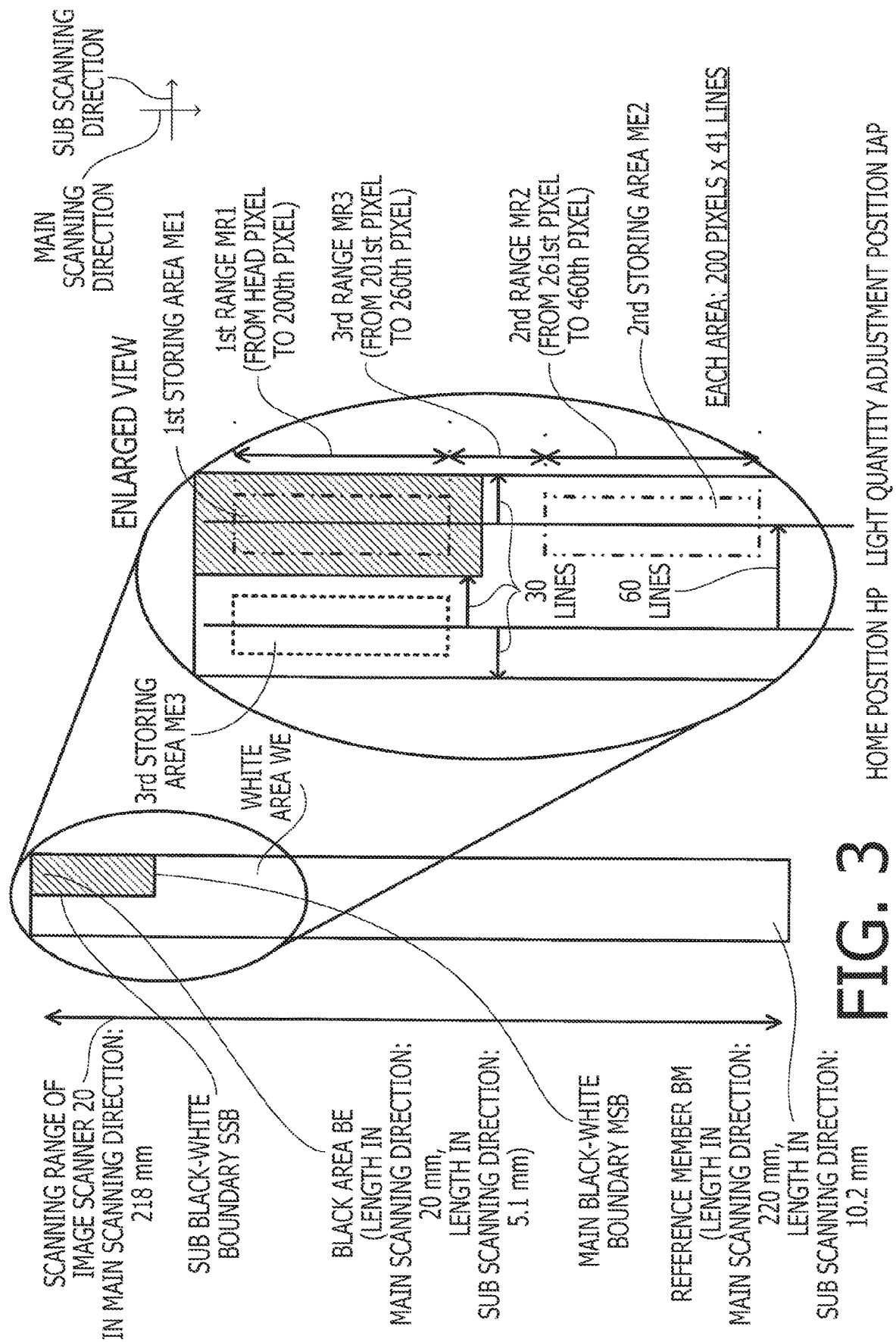
FIG. 3 shows a configuration of a reference member attached onto a transparent plate of the document table in the illustrative embodiment according to one or more aspects of the present disclosure.

The image scanning apparatus SM further includes a reference member BM fixedly attached onto the upper surface of the transparent plate TP. The reference member BM is disposed at an upstream end portion (i.e., a left end portion in FIG. 2) of the transparent plate TP in the sub scanning direction. As shown in FIG. 3, the reference member BM includes a white area WE and a black area BE. The reference member BM is formed in a rectangular shape having a length of 220 mm in the main scanning direction and a length of 10. 2 mm in the sub scanning direction. The black area BE is hatched with oblique lines in FIG. 3. The black area BE is a most upstream area of the reference member BM in the main scanning direction, and is a most downstream area of the reference member BM in the sub scanning direction. The black area BE is formed in a rectangular shape having a length of 20 mm in the main scanning direction and a length of 5.1 mm in the sub scanning direction. The white area WE is an area left by removing the black area BE from the reference member BM. A boundary, extending along the main scanning direction, between the black area BE and the white area WE is a sub black-white boundary SSB. A boundary, extending along the sub scanning direction, between the black area BE and the white area WE is a main black-white boundary MSB. In the illustrative embodiment, the length (i.e., 220 mm) of the reference member BM in the main scanning direction is slightly longer than 218 mm that is a scanning range of the image scanner 20 in the main scanning direction. There is a backlash or fitting looseness at a joint portion of the image scanner 20. Therefore, the image scanner 20 might be displaced up to 1 mm relative to the reference member BM in the main scanning direction. Even in such a case, the reference member BM is always opposed to the image scanner 20 within the scanning range of the image scanner 20.

Subsequently, referring to FIG. 3, a first storing area ME1, a second storing area ME2, a third storing area ME3, the home position HP, and a light quantity adjustment position IAP will be described. The home position HP is a position in the sub scanning direction. More specifically, the home position HP is a position located 300 lines upstream of the sub black-white boundary SSB in the sub scanning direction. A position of the sub black-white boundary SSB is a position of the image scanner 20 when an affirmative determination is made in a below-mentioned process UA3 (UA3: Yes) or a position of the image scanner 20 when an affirmative determination is made in a below-mentioned process UB11 (UB11: Yes). The image scanner 20 is movable along the sub scanning direction with the home position HP as a reference position. The light quantity adjustment position IAP is a position in the sub scanning direction. More specifically, the light quantity adjustment position IAP is located 60 lines downstream of the home position HP in the sub scanning direction. Below-mentioned processes U10 and D6 are performed when the image scanner 20 is in the light quantity adjustment position IAP. A first range MR1 is a range in the main scanning direction. More specifically, the first range MR1 is a range of the head pixel (i.e., a first pixel) to a $200^{th}$ pixel of the photoelectric conversion elements 23 in the main scanning direction. A second range MR2 is a range in the main scanning direction. More specifically, the second range MR2 is a range of a 260 pixel to a $460^{th}$ pixel of the photoelectric conversion elements 23 in the main scanning direction. A third range MR3 is a range in the main scanning direction. More specifically, the third range MR3 is a range of a $201^{st}$ pixel to a $260^{th}$ pixel of the photoelectric conversion elements 23 in the main scanning direction.

As indicated by an alternate long and short dash line in FIG. 3, the first storing area ME1 is defined by the first range MR1 in the main scanning direction and a range from a first specific position located 20 lines upstream of the light quantity adjustment position IAP in the sub scanning direction to a second specific position located 40 lines downstream of the first specific position in the sub scanning direction. As indicated by an alternate long and two short dashes line in FIG. 3, the second storing area ME2 is defined by the second range MR2 in the main scanning direction and a range from the first specific position located 20 lines upstream of the light quantity adjustment position IAP in the sub scanning direction to the second specific position located 40 lines downstream of the first specific position in the sub scanning direction. As indicated by a dashed line in FIG. 3, the third storing area ME3 is defined by the first range MR1 in the main scanning direction and a range from a first particular position located 20 lines upstream of the home position HP in the sub scanning direction to a second particular position located 40 lines downstream of the first particular position in the sub scanning direction. In the illustrative embodiment, as described above, the image scanner 20 might be displaced up to 1 mm relative to the reference member BM in the main scanning direction. Further, in a below-mentioned process U6, the sub black-white boundary SSB is detected every 8 lines. Therefore, the image scanner 20 might be displaced up to 8 lines relative to the reference member BM in the sub scanning direction.

Even in such a case, the first storing area ME1 is set not to protrude out of the black area BE, and the second and third storing areas ME2 and ME3 are set not to protrude out of the white area WE.

<Electrical Configuration of Image Scanning Apparatus>

Figure 4:
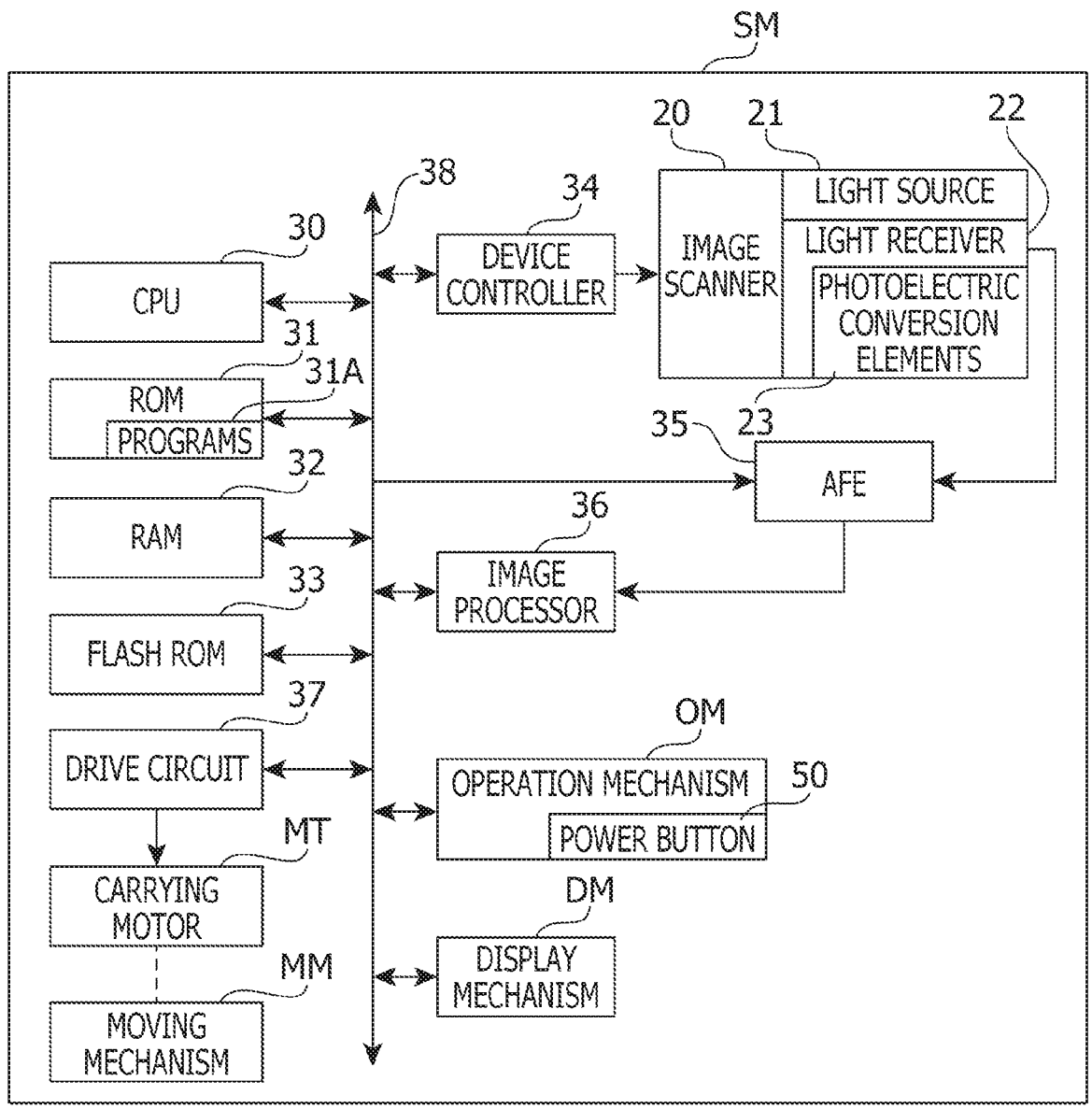
FIG. 4 is a block diagram schematically showing an electrical configuration of the image scanning apparatus in the illustrative embodiment according to one or more aspects of the present disclosure.

An electrical configuration of the image scanning apparatus SM will be described with reference to FIG. 4. As shown in FIG. 4, the image scanning apparatus SM includes a CPU 30, a ROM 31, a RAM 32, a flash ROM 33, a device controller 34, an analog front end (hereinafter referred to as an "AFE") 35, an image processor 36, and a drive circuit 37. The aforementioned elements are connected with an operation mechanism OM and a display mechanism DM via a bus 38. The operation mechanism OM includes a plurality of operable keys such as a start button and a determination button. By operating the operation mechanism OM, a user may input various instructions into the image scanning apparatus SM. The display mechanism DM includes a display configured to display various kinds of information.

The ROM 31 stores therein programs 31A for causing the image scanning apparatus SM to perform various processes (e.g., a below-mentioned activating process, a below-mentioned shutdown process, and subroutine processes). The CPU 30 is configured to control each of elements included in the image scanning apparatus SM in accordance with the programs 31A read out of the ROM 31. The flash ROM 33 is a non-volatile rewritable memory configured to store various types of data (e.g., data acquired in the activating process) generated in control processes by the CPU 30. The RAM 32 is configured to temporarily store calculation results generated in control processes by the CPU 30.

The device controller 34 is connected with the image scanner 20. The device controller 34 is configured to transmit, to the light source 21, a signal for turning on or off the light source 21 and a signal for controlling an electrical current to be supplied to the light source 21, based on instructions from the CPU 30. Further, the device controller 34 is configured to transmit, to the light receiver 22, a serial-in signal SI for concurrently transferring electrical signals from the photoelectric conversion elements 23 to the shift register (not shown) and a clock signal CLK for causing the shift register to sequentially output electrical signals, based on instructions from the CPU 30. In response to receipt of those signals from the device controller 34, the image scanner 20 turns on the light source 21, and transmits to the AFE 35 an analog signal corresponding to a quantity of light received by the light receiver 22.

The AFE 35 is connected with the image scanner 20. The AFE 35 is configured to convert the analog signal received from the image scanner 20 into digital data, based on an instruction from the CPU 30. The AFE 35 has a predetermined input range and a predetermined resolution. For instance, the resolution may be 8 bits (i.e., gradations from 0 to 255). In this case, the AFE 35 may convert the analog signal received from the image scanner 20 into 8-bit gradation data (ranging from 0 to 255) as digital data. The digital data obtained via the conversion by the AFE 35 is transmitted to the image processor 36.

The image processor 36 includes an ASIC specific for image processing. The image processor 36 is configured to apply black correction to the digital data. Nonetheless, the image processor 36 may be selectively set into one of a mode to enable the black correction and a mode to disable the black correction. When set into the mode to enable the black correction, the image processor 36 applies the black correction to subtract black correction data from the digital data and generates 8-bit gradation values GV. The gradation values GV are stored into the RAM 32 via the bus 38. Meanwhile, when set into the mode to disable the black correction, the image processor 36 stores the 8-bit digital data into the RAM 32. In the image processor 36, black correction data is set for the black correction.

The drive circuit 37 is connected with a carrying motor MT. The drive circuit 37 is configured to drive the carrying motor MT based on a driving instruction from the CPU 30. The drive circuit 37 rotates the carrying motor MT in accordance with a rotational quantity and a rotational direction specified by the driving instruction. In response to the carrying motor MT rotating by a particular rotational quantity, a moving mechanism MM rotates by a particular angle, thereby moving the image scanner 20 over a particular distance in the sub scanning direction.

<Operations by Image Scanning Apparatus>
(Activating Process)

Figure 5A:
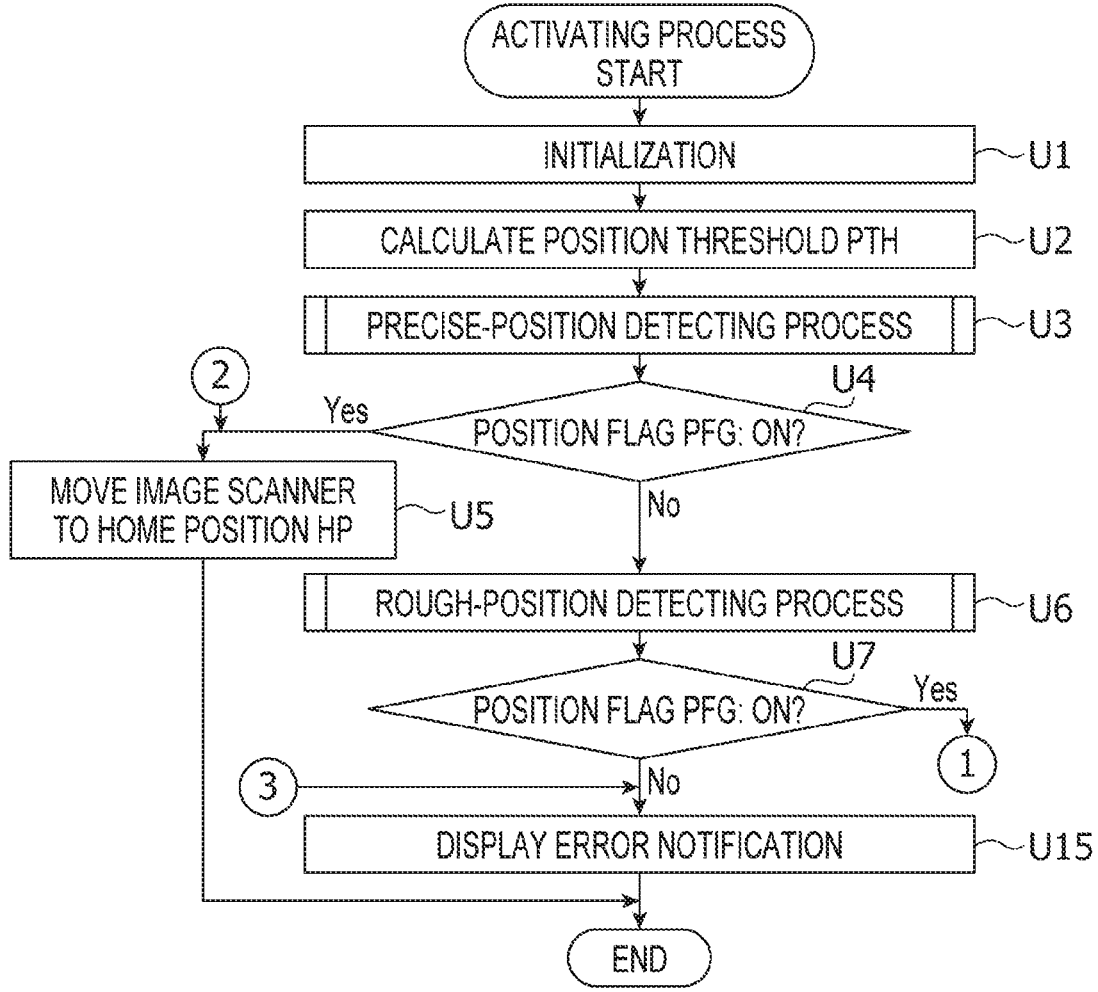
FIGS. 5A and 5B are flowcharts showing a procedure of an activating process in the illustrative embodiment according to one or more aspects of the present disclosure.
Figure 5B:
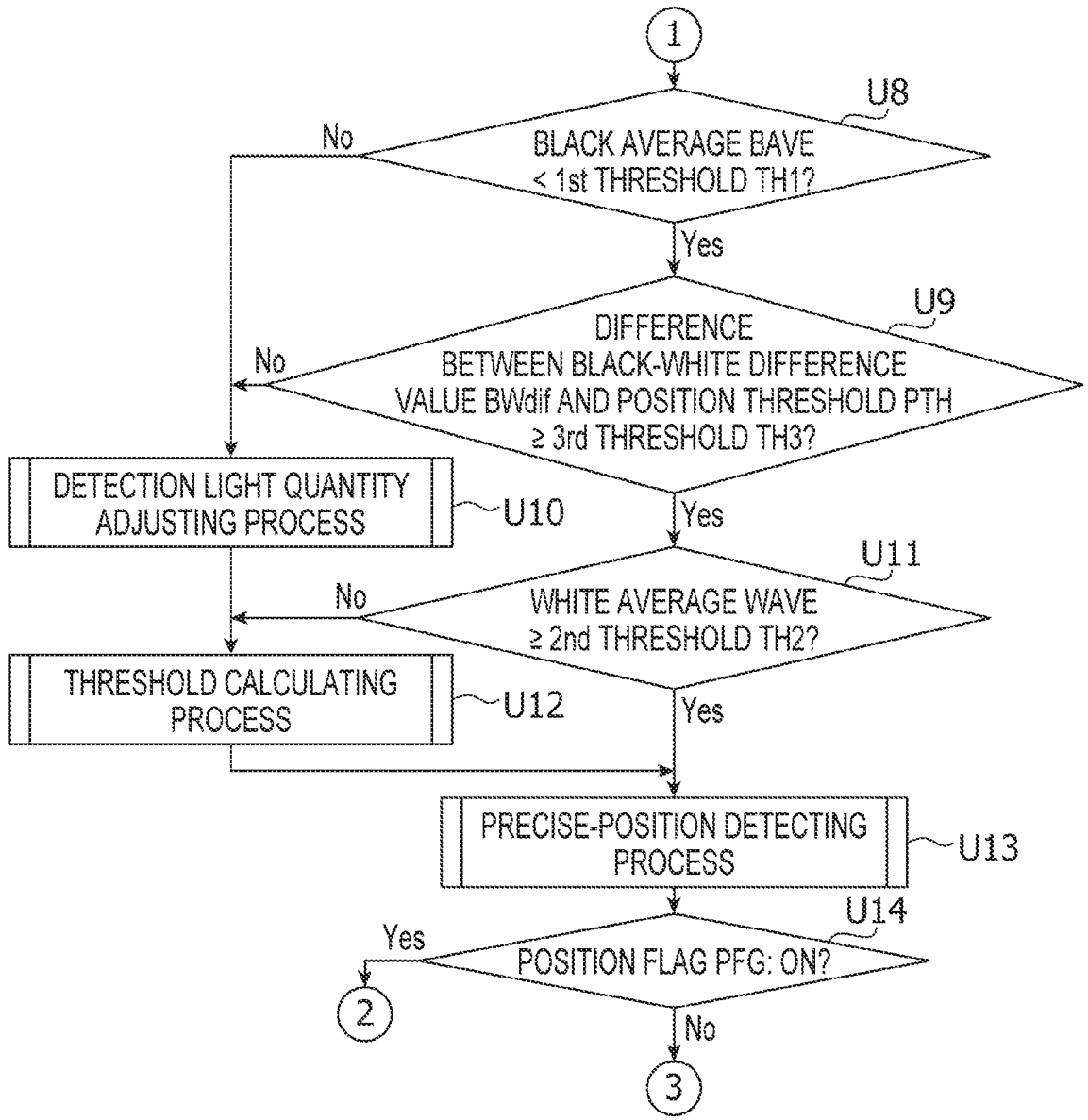
Figure 10:
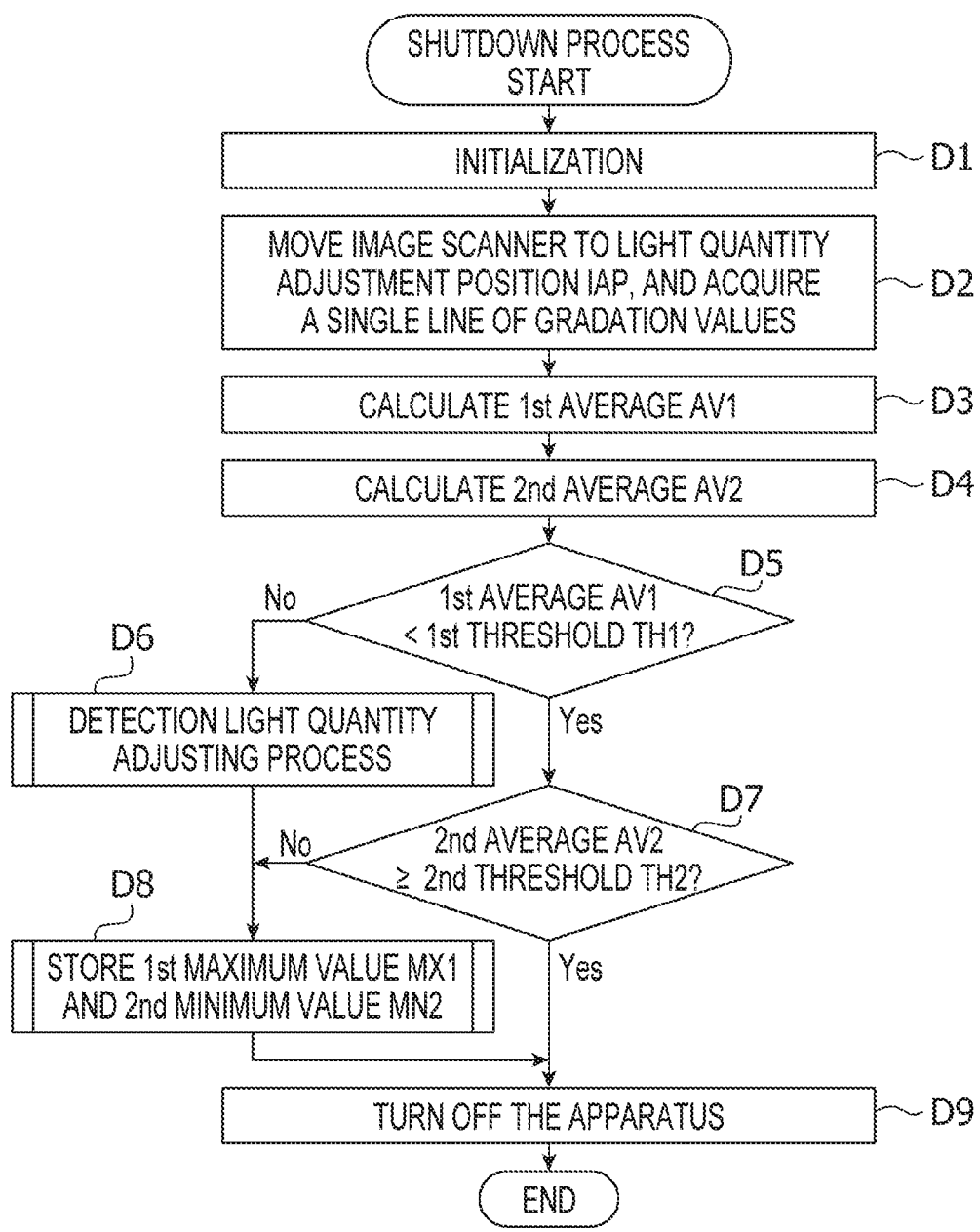
FIG. 10 is a flowchart showing a procedure of a shutdown process in the illustrative embodiment according to one or more aspects of the present disclosure.

Subsequently, operations by the image scanning apparatus SM will be described with reference to the accompanying drawings. The image scanning apparatus SM is configured to perform the activating process and the shutdown process. The activating process is performed in response to the image scanning apparatus SM being powered on. The shutdown process is performed to power off the image scanning apparatus SM. Processes U1 to U15 in the activating process (see FIGS. 5A and 5B) and processes D1 to D8 in the shutdown process (see FIG. 10) are performed by the CPU 30 executing one or more programs 31A stored in the ROM 31.

The activating process (see FIGS. 5A and 5B) is started in response to the image scanning apparatus SM being powered on from a shut-down state. Namely, the CPU 30 starts the activating process in response to receipt of an instruction representing that the image scanning apparatus SM has been powered on.

The CPU 30 initializes the device controller 34 and the image processor 36 (U1). Specifically, the CPU 30 acquires, from the flash ROM 33, settings for the clock signal CLK and the serial-in signal SI that are suitable for a scanning resolution of 300 DPI in the main scanning direction and a scanning resolution of 300 DPI in the sub scanning direction. Then, the CPU 30 applies the acquired settings to the device controller 34. The CPU 30 acquires, from the flash ROM 33, a detection light quantity DI of the light source 21. Then, the CPU 30 applies the acquired detection light quantity DI to the device controller 34. The CPU 30 configures settings for the black correction into the image processor 36. The CPU 30 acquires black correction data from the flash ROM 33, and sets the acquired black correction data into the image processor 36. In the illustrative embodiment, for instance, the black correction data may be a smallest value included in single-line digital data for a black color that has been acquired at the time of factory shipping. The detection light quantity DI may include or may be determined by a value of an electrical current to be supplied to the light source 21 and a period of time during which the light source 21 is kept turned on. More specifically, the detection light quantity DI may include or may be determined by a maximum value of an electrical current suppliable to the light source 21 and a longest period of time during which the light source 21 may be kept turned on among time intervals of the serial-in signal SI, at the time of factory shipping. The detection light quantity DI is updated and stored in the below-mentioned processes U10 and D6.

The CPU 30 calculates a position threshold PTH (U2). Specifically, the CPU 30 acquires a first maximum value MX1 and a second minimum value MN2 from the flash ROM 33. The CPU 30 averages the first maximum value MX1 and the second minimum value MN2, thereby calculating the position threshold PTH. The CPU 30 sets the position threshold PTH as a sub position threshold SPTH, and sets the position threshold PTH as a main position threshold MPTH. In the illustrative embodiment, the first maximum value MX1 and the second minimum value MN2 may be stored into the flash ROM 33 at the time of factory shipping, and are updated and held in the flash ROM 33 in a process U12 or the process D8.

The CPU 30 performs a precise-position detecting process (U3). The precise-position detecting process U3 will be described in detail later. A general outline of the process U3 will be provided here. The CPU 30 transmits, to the drive circuit 37, a driving instruction to move the image scanner 20 downstream in the sub scanning direction. The CPU 30 determines whether a first minimum value MN1 in the first range MR1 is less than the sub position threshold SPTH. The CPU 30 stores, into the RAM 32, a position that is located 30 lines upstream, in the sub scanning direction, of a position of the image scanner 20 where it is determined that the first minimum value MN1 in the first range MR1 is less than the sub position threshold SPTH, as the home position HP. The CPU 30 transmits, to the drive circuit 37, a driving instruction to move the image scanner 20 downstream in the sub scanning direction. In the third range MR3, the CPU 30 searches for a position of a specific pixel at which the gradation value GV becomes less than the main position threshold MPTH from a value equal to or more than the main position threshold MPTH, in the upstream direction along the main scanning direction from a $260^{th}$-pixel position (on the basis of the head pixel as the first pixel) in the main scanning direction. The CPU 30 determines, as a boundary position BDP, the found position of the specific pixel at which the gradation value GV has changed from a value equal to or more than the main position threshold MPTH to a value less than the main position threshold MPTH. The CPU 30 acquires, as a boundary data group BDG, gradation values GV of 10 pixels that are located upstream of the boundary position BDP in the main scanning direction. The CPU 30 determines whether all of the gradation values GV in the boundary data group BDG represent the black color. When determining that all of the gradation values GV in the boundary data group BDG represent the black color, the CPU 30 stores, into the RAM 32, a position that is located 185 pixels upstream of the boundary position BDP in the main scanning direction, as the scanning start position RSP. When storing the home position HP and the scanning start position RSP into the RAM 32, the CPU 30 sets a position flag PFG to "ON." Meanwhile, when not storing at least one of the home position HP and the scanning start position RSP into the RAM 32, the CPU 30 sets the position flag PFG to "OFF."

The CPU 30 determines whether the position flag PFG is "ON" (U4). When determining that the position flag PFG is not "ON" (U4: No), the CPU 30 goes to a process U6. Meanwhile, when determining that the position flag PFG is "ON" (U4: Yes), the CPU 30 goes to a process U5. In the process U5, the CPU 30 transmits, to the drive circuit 37, a driving instruction to move the image scanner 20 to the home position HP stored in the RAM 32 (U5). After completion of the process U5, the CPU 30 terminates the activating process.

The CPU 30 performs a rough-position detecting process (U6). The rough-position detecting process U6 will be described in detail later. A general outline of the process U6 will be provided here. The CPU 30 transmits, to the drive circuit 37, a driving instruction to move the image scanner 20 upstream in the sub scanning direction. The CPU 30 determines whether the first range MR1 is black and the second range MR2 is white. The CPU 30 moves the image scanner 20 just over a distance of 8 lines upstream in the sub scanning direction from a position in the sub scanning direction where it is determined that the first range MR1 is black and that the second range MR2 is white. The CPU 30 averages all of the gradation values GV included in the first range MR1, and stores the average value as a black average BAVE into the RAM 32. The CPU 30 averages all of the gradation values GV included in the second range MR2, and stores the average value as a white average WAVE into the RAM 32. The CPU 30 calculates a black-white difference value BWdif by subtracting the black average BAVE from the white average WAVE. The CPU 30 transmits, to the drive circuit 37, a driving instruction to move the image scanner 20 upstream in the sub scanning direction. The CPU 30 determines whether the first range MR1 is white and the second range MR2 is white. The CPU 30 stores, into the RAM 32, a position that is located 30 lines upstream, in the sub scanning direction, of a position where it is determined that the first range MR1 is white and that the second range MR2 is white, as the home position HP. When storing the home position HP, the CPU 30 sets the position flag PFG to "ON." Meanwhile, when not storing the home position HP, the CPU 30 sets the position flag PFG to "OFF."

The CPU 30 determines whether the position flag PFG is "ON" (U7). When determining that the position flag PFG is not "ON" (U7: No), the CPU 30 goes to a process U15. Meanwhile, when determining that the position flag PFG is "ON" (U7: Yes), the CPU 30 goes to a process U8.

The CPU 30 determines whether the black average BAVE is less than a first threshold TH1 (U8). When determining that the black average BAVE is not less than the first threshold TH1 (U8: No), the CPU 30 goes to a process U10. Meanwhile, when determining that the black average BAVE is less than the first threshold TH1 (U8: Yes), the CPU 30 goes to a process U9. In the illustrative embodiment, the first threshold TH1 may be 30. The first threshold TH1 (i.e., 30) is a maximum value of varying gradation values GV acquired by single-line scanning of the black color along the main scanning direction. Thus, when the first threshold TH1 is set to 30, it is possible to accurately determine whether a black output value (i.e., an output value from the image scanner 20 when scanning the black area BE of the reference member BM) becomes higher due to color degradation caused by aging of the black area BE, without making erroneous determination owing to variation of gradation values GV acquired by scanning the black area BE.

The CPU 30 determines whether a difference between the black-white difference value BWdif and the position threshold PTH is equal to or more than a third threshold TH3 (U9). Specifically, the CPU 30 determines whether a value obtained by subtracting the position threshold PTH from the black-white difference value BWdif is equal to or more than the third threshold TH3. When determining that the difference between the black-white difference value BWdif and the position threshold PTH is equal to or more than the third threshold TH3 (U9: Yes), the CPU 30 goes to a process U11. Meanwhile, when determining that the difference between the black-white difference value BWdif and the position threshold PTH is not equal to or more than the third threshold TH3 (U9: No), the CPU 30 goes to the process U10. In the illustrative embodiment, the third threshold TH3 may be 25. The third threshold TH3 (i.e., 25) is about 10% of the count of the gradations for gradation values GV. By determining whether the difference between the black-white difference value BWdif and the position threshold PTH is equal to or more than 10% of the count of the gradations, it is possible to detect the reference member BM even when the black output value or a white output value (i.e., an output value from the image scanner 20 when scanning the white area WE of the reference member BM) slightly changes due to a secular change of the reference member BM.

In response to the negative determination (U9: No) in the process U9 or the negative determination (U8: No) in the process U8, the CPU 30 performs a detection light quantity adjusting process (U10). The detection light quantity adjusting process U10 will be described in detail later. A general outline of the process U10 will be provided here. The CPU 30 transmits, to the drive circuit 37, a driving instruction to move the image scanner 20 to the light quantity adjustment position IAP. The CPU 30 acquires, as a detection light quantity DI, a light quantity to maximize a value obtained by subtracting a maximum one of gradation values GV included in the first range MR1 from a minimum one of gradation values GV included in the second range MR2. Then, the CPU 30 stores the detection light quantity DI into the flash ROM 33. After completion of the process U10, the CPU 30 goes to a process U12.

When determining that the difference between the black-white difference value BWdif and the position threshold PTH is equal to or more than the third threshold TH3 (U9: Yes), the CPU 30 determines whether the white average WAVE is equal to or more than a second threshold TH2 (U11). When determining that the white average WAVE is equal to or more than the second threshold TH2 (U11: Yes), the CPU 30 goes to a process U13. Meanwhile, when determining that the white average WAVE is not equal to or more than the second threshold TH2 (U11: No), the CPU 30 goes to a process U12. In the illustrative embodiment, the second threshold TH2 may be 127, which is an integer part of a value obtained by dividing the upper limit (i.e., 255) of the 8-bit gradation data by 2. Assuming that a maximum value of outputs from the image scanner 20 during single-line scanning of a white color is expressed as 100%, a minimum value of the outputs from the image scanner 20 during the single-line scanning of the white color might be 50%. Even in such a case, when the second threshold TH2 is set to 127, it is possible to determine whether the white output value (i.e., an output value from the image scanner 20 when scanning the white area WE of the reference member BM) is reduced due to color degradation caused by aging of the white area WE, without making erroneous determination due to variation of gradation values GV acquired by single-line scanning of the white area WE.

In response to the negative determination (U11: No) in the process U11 or completion of the process U10, the CPU 30 performs a threshold calculating process (U12). The threshold calculating process U12 will be described in detail later. A general outline of the process U12 will be provided here. The CPU 30 transmits, to the drive circuit 37, a driving instruction to move the image scanner 20 to the home position HP. The CPU 30 acquires a third data group DG3 of gradation values GV within the third storing area ME3. The CPU 30 stores, into the flash ROM 33, a minimum one of gradation values GV included in the acquired third data group DG3, as a third minimum value MN3. The CPU 30 transmits, to the drive circuit 37, a driving instruction to move the image scanner 20 to the light quantity adjusting position IAP. The CPU 30 acquires gradation values GV within the first storing area ME1 as a first data group DG1, and acquires gradation values GV within the second storing area ME2 as a second data group DG2. The CPU 30 stores, into the flash ROM 33, a maximum one of the gradation values GV included in the acquired first data group DG1, as a first maximum value MX1. Further, the CPU 30 stores, into the flash ROM 33, a minimum one of the gradation values GV included in the acquired second data group DG2, as a second minimum value MN2. The CPU 30 calculates an average of the first maximum value MX1 and the second minimum value MN2, and stores the calculated average as the main position threshold MPTH into the RAM 32. The CPU 30 calculates an average of the first maximum value MX1 and the third minimum value MN3, and stores the calculated average as the sub position threshold SPTH into the RAM 32.

In response to the affirmative determination (U11: Yes) in the process U11 or completion of the process U12, the CPU 30 performs a precise-position detecting process (U13). The precise-position detecting process U13 will be described in detail later. A general outline of the process U13 will be provided here. The CPU 30 transmits, to the drive circuit 37, a driving instruction to move the image scanner 20 downstream in the sub scanning direction. The CPU 30 determines whether the first minimum value MN1 in the first range MR1 is less than the sub position threshold SPTH. The CPU 30 stores, into the RAM 32, a position that is located 30 lines upstream, in the sub scanning direction, of a position where it is determined that the first minimum value MN1 in the first range MR1 is less than the sub position threshold SPTH, as the home position HP. The CPU 30 transmits, to the drive circuit 37, a driving instruction to move the image scanner 20 downstream in the sub scanning direction. In the third range MR3, the CPU 30 searches for a position of a pixel of which a value has changed from a value equal to or more than the main position threshold MPTH to a value less than the main position threshold MPTH, in the upstream direction along the main scanning direction from the $260^{th}$-pixel position in the main scanning direction. The CPU 30 determines the position of the pixel found via the search, as a boundary position BDP. The CPU 30 acquires, as the boundary data group BDG, gradation values GV of 10 pixels that are located upstream of the boundary position BDP in the main scanning direction. The CPU 30 determines whether all of the gradation values GV included in the boundary data group BDG represent the black color. When determining that all of the gradation values GV included in the boundary data group BDG represent the black color, the CPU 30 stores, into the RAM 32, the position that is located 185 pixels upstream of the boundary position BDP in the main scanning direction, as the scanning start position RSP. When storing the home position HP and the scanning start position RSP into the RAM 32, the CPU 30 sets the position flag PFG to "ON." Meanwhile, when not storing at least one of the home position HP and the scanning start position RSP into the RAM 32, the CPU 30 sets the position flag PFG to "OFF."

The CPU 30 determines whether the position flag PFG is "ON" (U14). When determining that the position flag PFG is "ON" (U14: Yes), the CPU 30 goes to the process U5. Meanwhile, when determining that the position flag PFG is not "ON" (U14: No), the CPU 30 goes to the process U15. In the process U15, the CPU 30 transmits, to the display mechanism DM, a display instruction to cause the display mechanism DM to display a notification that it is impossible to specify the position of the image scanner 20. After completion of the process U15, the CPU 30 terminates the activating process.

(Precise-Position Detecting Process)

Figure 6:
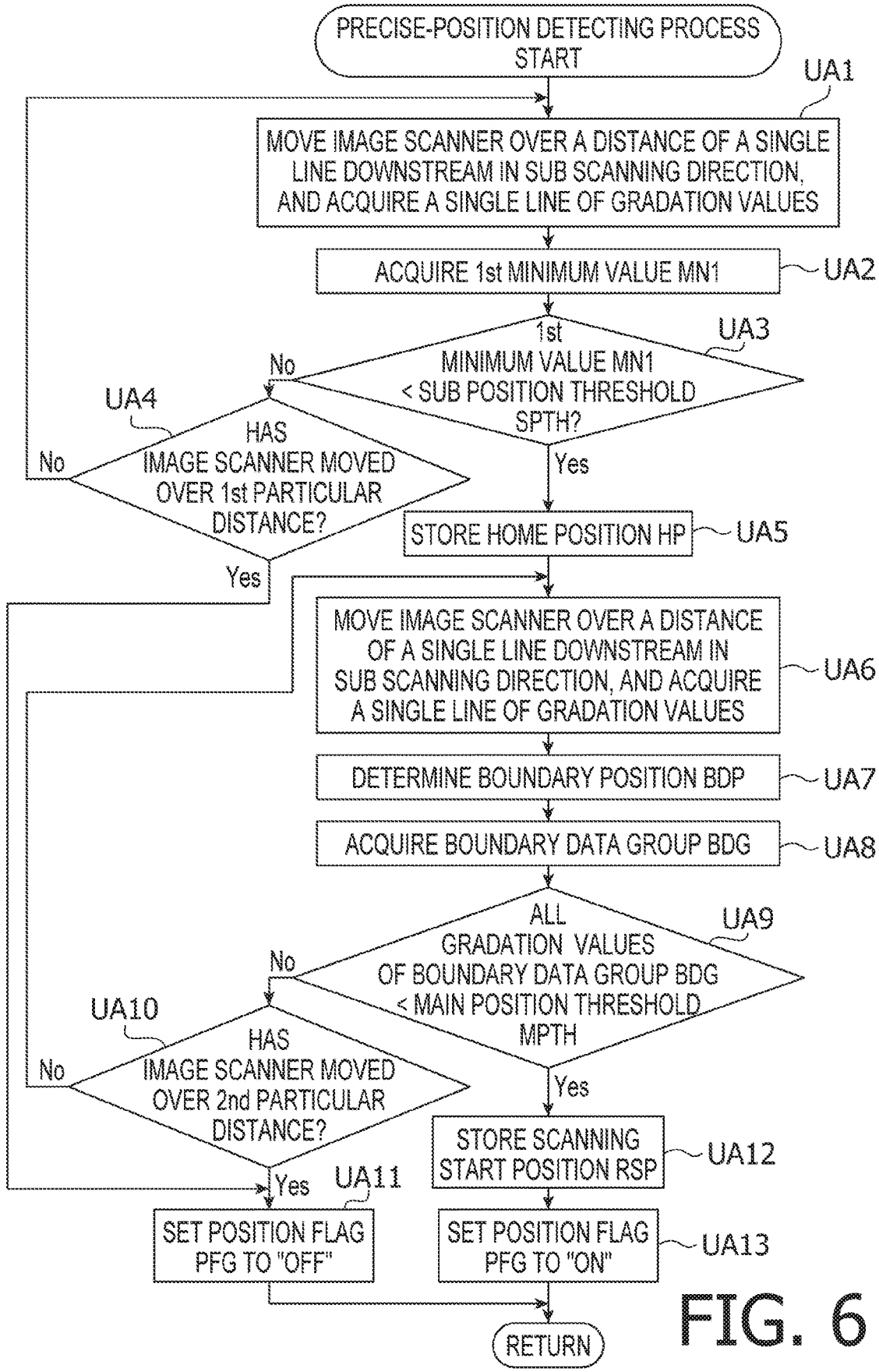
FIG. 6 is a flowchart showing a procedure of a precise-position detecting process in the illustrative embodiment according to one or more aspects of the present disclosure.

When the precise-position detecting process (U3 or U13) shown in FIG. 6 is started, the CPU 30 moves the image scanner 20 just over a distance of a single line, downstream in the sub scanning direction, and acquires a single line of gradation values GV (UA1). Specifically, the CPU 30 transmits, to the drive circuit 37, a driving instruction to move the image scanner 20 just over the distance of a single line downstream in the sub scanning direction. The CPU 30 acquires a gradation value GV of each pixel included in the single line by scanning the reference member BM while keeping the light source 21 turned on with the detection light quantity DI.

The CPU 30 acquires the first minimum value MN1 (UA2). Specifically, the CPU 30 acquires, as the first minimum value MN1, a minimum one of gradation values GV within the first range MR1 among the single line of gradation values GV acquired in the process UA1.

The CPU 30 determines whether the first minimum value MN1 is less than the sub position threshold SPTH (UA3). When determining that the first minimum value MN1 is less than the sub position threshold SPTH (UA3: Yes), the CPU 30 goes to a process UA5. Meanwhile, when determining that the first minimum value MN1 is not less than the sub position threshold SPTH (UA3: No), the CPU 30 goes to a process UA4.

The CPU 30 determines whether the image scanner 20 has moved over a first particular distance in the repeatedly-executed process UA1 (UA4). When determining that the image scanner 20 has moved over the first particular distance (UA4: Yes), the CPU 30 goes to a process UA11. Meanwhile, when determining that the image scanner 20 has not moved over the first particular distance (UA4: No), the CPU 30 goes to the process UAL In the illustrative embodiment, the first particular distance may be a distance of 90 lines in the sub scanning direction. When the image scanner 20 moves over the first particular distance (i.e., the distance of 90 lines) from the home position HP, the image scanner 20 reaches a position where the image scanner 20 does not face the reference member BM. The precise-position detecting process (U3 or U13) is a process to detect the sub black-white boundary SSB and the main black-white boundary MSB of the reference member BM while moving the image scanner 20 downstream from the home position HP in the sub scanning direction. When the image scanner 20 moves over the first particular distance (i.e., the distance of 90 lines) from the home position HP, it denotes that the reference member BM has not been successfully detected.

When determining that the first minimum value MN1 is less than the sub position threshold SPTH (UA3: Yes), the CPU 30 stores the home position HP (UA5). Specifically, the CPU 30 stores, into the RAM 32, a position that is located 30 lines upstream, in the sub scanning direction, of a position of the image scanner 20 where it is determined in the process UA3 that the first minimum value MN1 is less than the sub position threshold SPTH, as the home position HP.

In response to completion of the process UA5 or the negative determination (UA10: No) in the process UA10, the CPU 30 moves the image scanner 20 just over the distance of a single line, downstream in the sub scanning direction, and acquires a single line of gradation values GV (UA6). Specifically, the CPU 30 transmits, to the drive circuit 37, a driving instruction to move the image scanner 20 just over the distance of a single line downstream in the sub scanning direction. The CPU 30 acquires a gradation value GV of each pixel included in the single line by scanning the reference member BM while keeping the light source 21 turned on with the detection light quantity DI.

The CPU 30 determines the boundary position BDP (UA7). Specifically, the CPU 30 searches for a specific pixel at which the gradation value GV becomes less than the main position threshold MPTH, in the upstream direction along the main scanning direction from the $260^{th}$ pixel in the main scanning direction, among the single line of gradation values GV acquired in the process UA6. The CPU 30 determines a position of the specific pixel at which the gradation value GV becomes less than the main position threshold MPTH, as a boundary position BDP. In the illustrative embodiment, a range in which the CPU 30 searches for the specific pixel in the main scanning direction is the third range MR3 from the $260^{th}$ pixel to the $201^{st}$ pixel.

The CPU 30 acquires the boundary data group BDG (UA8). Specifically, the CPU 30 acquires, as the boundary data group BDG, gradation values GV of 10 pixels that are located upstream, in the main scanning direction, of the boundary position BDP among the single line of gradation values GV acquired in the process UA6.

The CPU 30 determines whether all of the gradation values GV included in the boundary data group BDG are less than the main position threshold MPTH (UA9). When determining that all of the gradation values GV included in the boundary data group BDG are less than the main position threshold MPTH (UA9: Yes), the CPU 30 goes to a process UA12. Meanwhile, when determining that at least one of the gradation values GV included in the boundary data group BDG is equal to or more than the main position threshold MPTH (UA9: No), the CPU 30 goes to a process UA10.

The CPU 30 determines whether the image scanner 20 has moved over a second particular distance in the repeatedly-executed process UA6 (UA10). When determining that the image scanner 20 has not moved over the second particular distance (UA10: No), the CPU 30 goes to the process UA6. Meanwhile, when determining that the image scanner 20 has moved over the second particular distance (UA10: Yes), the CPU 30 goes to the process UA11. In the illustrative embodiment, the second particular distance may be a distance of 60 lines in the sub scanning direction. When the image scanner 20 moves over the second particular distance (i.e., the distance of 60 lines) from the sub black-white boundary SSB, the image scanner 20 reaches a position where the image scanner 20 does not face the reference member BM. When the image scanner 20 moves over the second particular distance (i.e., the distance of 60 lines) from the sub black-white boundary SSB, it denotes that the reference member BM has not been successfully detected.

In response to the affirmative determination (UA10: Yes) in the process UA10 or the affirmative determination (UA4: Yes) in the process UA4, the CPU 30 sets the position flag PFG to "OFF" and stores the set value of the position flag PFG into the RAM 32 (UA11). After completion of the process UA11, the CPU 30 terminates the precise-position detecting process (U3 or U13) and returns to the activating process (see FIGS. 5A and 5B).

When determining that all of the gradation values GV included in the boundary data group BDG are less than the main position threshold MPTH (UA9: Yes), the CPU 30 stores the scanning start position RSP (UA12). Specifically, the CPU 30 stores, into the RAM 32, a position that is located 185 pixels upstream of the boundary position BDP in the main scanning direction, as the scanning start position RSP.

The CPU 30 sets the position flag PFG to "ON" and stores the set value of the position flag PFG into the RAM 32 (UA13). After completion of the process UA13, the CPU 30 terminates the precise-position detecting process (U3 or U13) and returns to the activating process (see FIGS. 5A and 5B).

(Rough-Position Detecting Process)

Figure 7A:
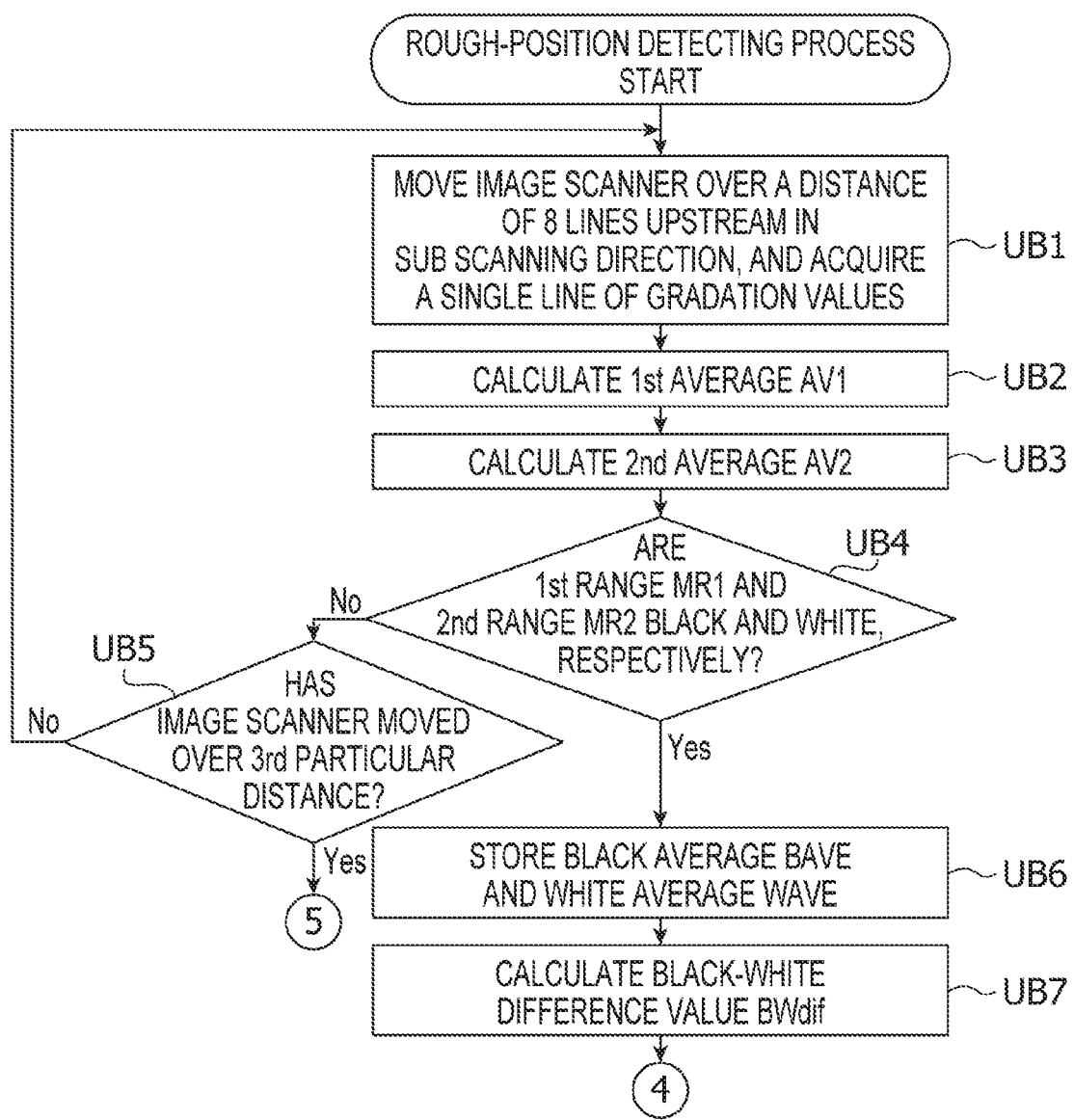
FIGS. 7A and 7B are flowcharts showing a procedure of a rough-position detecting process in the illustrative embodiment according to one or more aspects of the present disclosure.
Figure 7B:
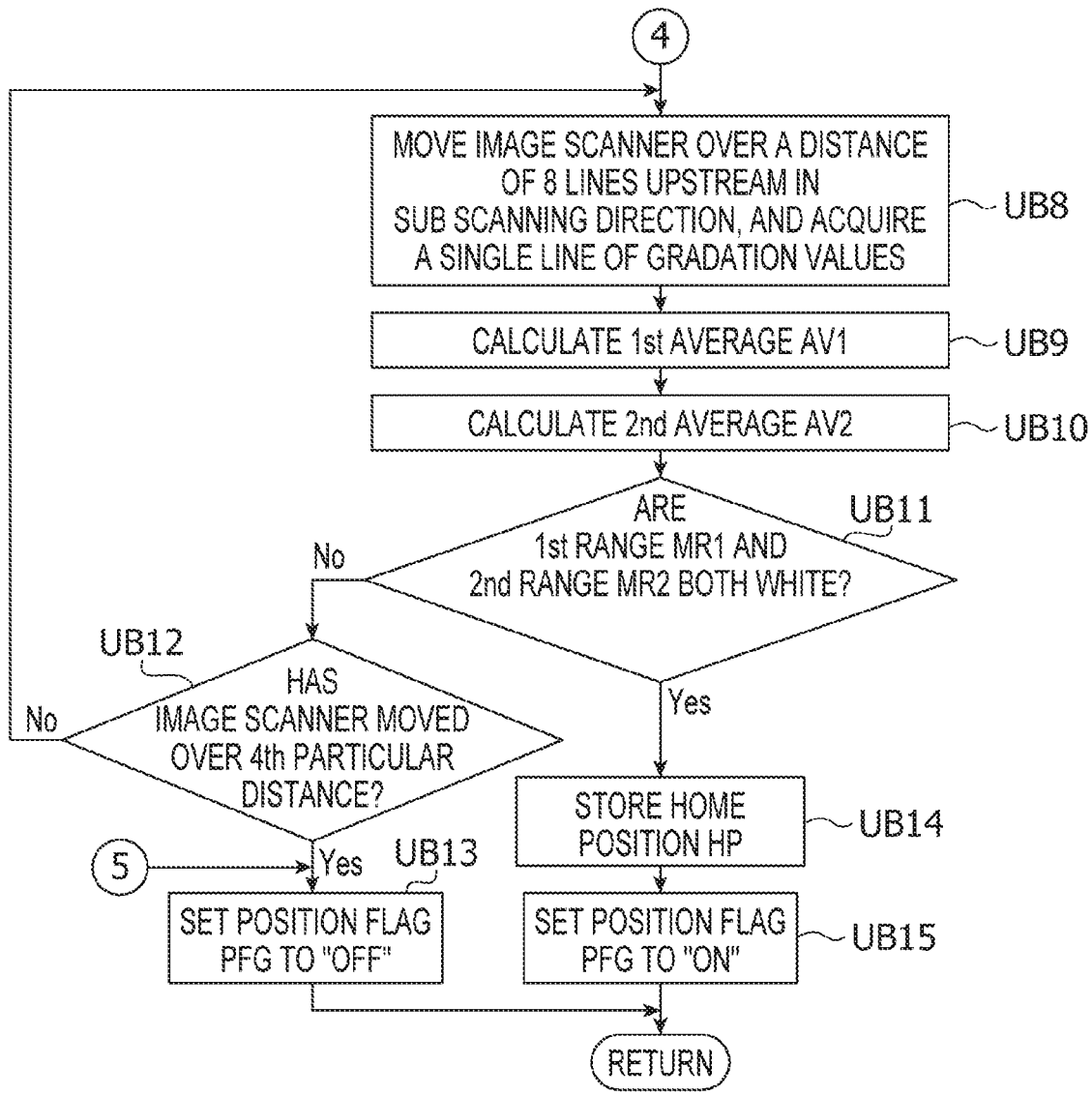

When the rough-position detecting process U6 (see FIGS. 7A and 7B) is started, the CPU 30 moves the image scanner 20 just over a distance of 8 lines upstream in the sub scanning direction, and acquires a single line of gradation values GV (UB1). Specifically, the CPU 30 transmits, to the drive circuit 37, a driving instruction to move the image scanner 20 just over the distance of 8 lines upstream in the sub scanning direction. The CPU 30 acquires a gradation value GV of each pixel included in the single line by scanning the reference member BM while keeping the light source 21 turned on with the detection light quantity DI. Further, the process UB1 is also performed in response to a negative determination (UB5: No) in a below-mentioned process UB5.

The CPU 30 calculates a first average AV1 (UB2). Specifically, the CPU 30 calculates the first average AV1 by averaging all of the gradation values GV within the first range MR1 among the single line of gradation values GV acquired in the process UB1.

The CPU 30 calculates a second average AV2 (UB3). Specifically, the CPU 30 calculates the second average AV2 by averaging all of the gradation values GV within the second range MR2 among the single line of gradation values GV acquired in the process UB1.

The CPU 30 determines whether the first range MR1 is black and the second range MR2 is white (UB4). Specifically, when the first average AV1 is less than the position threshold PTH, and the second average AV2 is equal to or more than the position threshold PTH, the CPU 30 determines that the first range MR1 is black and that the second range MR2 is white (UB4: Yes), and goes to a process UB6. Meanwhile, when the first average AV1 is equal to or more than the position threshold PTH, or the second average AV2 is less than the position threshold PTH, the CPU 30 determines that the first range MR1 is not black or that the second range MR2 is not white (UB4: No), and goes to a process UB5.

The CPU 30 determines whether the image scanner 20 has moved over a third particular distance or longer in the repeatedly-executed process UB1 (UB5). When determining that the image scanner 20 has moved over the third particular distance (UB5: Yes), the CPU 30 goes to a process UB12. Meanwhile, when determining that the image scanner 20 has not moved over the third particular distance (UB5: No), the CPU 30 goes to the process UB1. In the illustrative embodiment, the third particular distance may be a distance of 3670 lines in the sub scanning direction. When the image scanner 20 moves upstream in the sub scanning direction over the third particular distance (i.e., the distance of 3670 lines) from the maximum scanning position MSE, the image scanner 20 reaches the sub black-white boundary SSB. The rough-position detecting process U6 is a process to detect the sub black-white boundary SSB of the reference member BM. When the image scanner 20 moves over the third particular distance (i.e., the distance of 3670 lines), it denotes that the sub black-white boundary SSB of the reference member BM has not been successfully detected.

When determining that the first range MR1 is black and that the second range MR2 is white (UB4: Yes), the CPU 30 stores the black average BAVE and the white average WAVE (UB6). Specifically, the CPU 30 transmits, to the drive circuit 37, a driving instruction to move the image scanner 20 to a position that is located 8 lines upstream in the sub scanning direction. The CPU 30 acquires a single line of gradation values GV by scanning the reference member BM while keeping the light source 21 turned on with the detection light quantity DI. The CPU 30 calculates the black average BAVE by averaging all of the gradation values GV within the first range MR1 among the acquired single line of gradation values GV, and stores the calculated black average BAVE into the RAM 32. The CPU 30 calculates the white average WAVE by averaging all of the gradation values GV within the second range MR2 among the acquired single line of gradation values GV, and stores the calculated white average WAVE into the RAM 32.

The CPU 30 calculates the black-white difference value BWdif by subtracting the black average BAVE from the white average WAVE (UB7).

In response to completion of the process UB7 or the negative determination (UB12: No) in the process UB12, the CPU 30 moves the image scanner 20 just over the distance of 8 lines upstream in the sub scanning direction, and acquires a single line of gradation values GV (UB8). Specifically, the CPU 30 transmits, to the drive circuit 37, a driving instruction to move the image scanner 20 just over the distance of 8 lines upstream in the sub scanning direction. The CPU 30 acquires a gradation value GV of each pixel included in the single line by scanning the reference member BM while keeping the light source 21 turned on with the detection light quantity DI.

The CPU 30 calculates the first average AV1 (UB9). Specifically, the CPU 30 calculates the first average AV1 by averaging all of the gradation values GV within the first range MR1 among the single line of gradation values GV acquired in the process UB8.

The CPU 30 calculates the second average AV2 (UB10). Specifically, the CPU 30 calculates the second average AV2 by averaging all of the gradation values GV within the second range MR2 among the single line of gradation values GV acquired in the process UB8.

The CPU 30 determines whether the first range MR1 is white and the second range MR2 is white (UB11). Specifically, when the first average AV1 calculated in the process UB9 is equal to or more than the position threshold PTH, and the second average AV2 calculated in the process UB10 is equal to or more than the position threshold PTH, the CPU 30 determines that the first range MR1 is white and that the second range MR2 is white (UB11: Yes), and goes to a process UB14. Meanwhile, when the first average AV1 calculated in the process UB9 is less than the position threshold PTH, or the second average AV2 calculated in the process UB10 is less than the position threshold PTH, the CPU 30 determines that the first range MR1 is not white or that the second range MR2 is not white (UB11: No), and goes to a process UB11.

The CPU 30 determines whether the image scanner 20 has moved over a fourth particular distance in the repeatedly-executed process UB8 (UB12). When determining that the image scanner 20 has not moved over the fourth particular distance (UB12: No), the CPU 30 goes to the process UB8. Meanwhile, when determining that the image scanner 20 has moved over the fourth particular distance (UB12: Yes), the CPU 30 goes to a process UB13. In the illustrative embodiment, the fourth particular distance may be a distance of 56 lines in the sub scanning direction. When the image scanner 20 moves upstream in the sub scanning direction over the fourth particular distance (i.e., the distance of 56 lines) from a most downstream position of the black area BE in the sub scanning direction, the image scanner 20 reaches the sub black-white boundary SSB. When the image scanner 20 moves over the fourth particular distance (i.e., the distance of 56 lines), it denotes that the sub black-white boundary SSB of the reference member BM has not been successfully detected.

In response to the affirmative determination (UB12: Yes) in the process UB12 or the affirmative determination (UB5: Yes) in the process UB5, the CPU 30 sets the position flag PFG to "OFF" and stores the set value of the position flag PFG into the RAM 32 (UB13). After completion of the process UB13, the CPU 30 terminates the rough-position detecting process U6, and returns to the activating process (see FIGS. 5A and 5B).

When determining that the first range MR1 is white and that the second range MR2 is white (UB11: Yes), the CPU 30 stores the home position HP (UB14). Specifically, the CPU 30 stores, into the RAM 32, a position that is located 30 lines upstream, in the sub scanning direction, of a position of the image scanner 20 where it is determined that the first range MR1 is white and that the second range MR2 is white (UB11: Yes), as the home position HP. The CPU 30 transmits, to the drive circuit 37, a driving instruction to move the image scanner 20 to the home position HP.

The CPU 30 sets the position flag PFG to "ON" and stores the set value of the position flag PFG into the RAM 32 (UB15). After completion of the process UB15, the CPU 30 terminates the rough-position detecting process U6, and returns to the activating process (see FIGS. 5A and 5B).

(Detection Light Quantity Adjusting Process)

Figure 8:
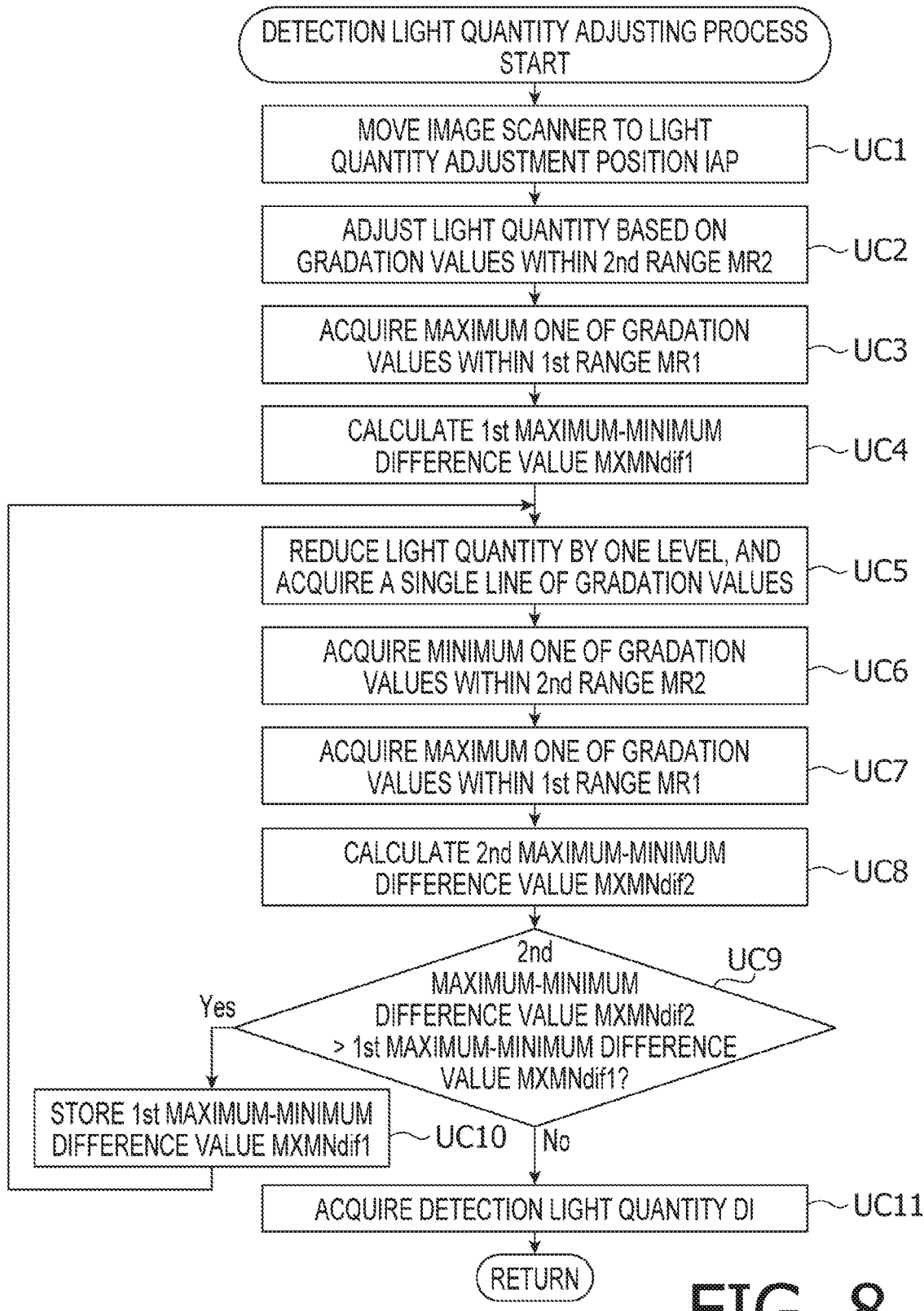
FIG. 8 is a flowchart showing a procedure of a detection light quantity adjusting process in the illustrative embodiment according to one or more aspects of the present disclosure.

When the detection light quantity adjusting process (U10 or D6) shown in FIG. 8 is started, the CPU 30 moves the image scanner 20 to the light quantity adjustment position IAP (UC1). Specifically, the CPU 30 transmits, to the drive circuit 37, a driving instruction to move the image scanner 20 to the light quantity adjustment position IAP.

The CPU 30 adjusts a quantity of light from the light source 21 (UC2). Specifically, the CPU 30 controls the light source 21 to illuminate the reference member BM while keeping the light source 21 turned on with a maximum electric current value. In this state, the CPU 30 adjusts a lighting period of time in such a manner that a minimum one of gradation values GV acquired within the second range MR2 when the image scanner 20 receives reflected light from the illuminated reference member BM becomes 255.

The CPU 30 acquires a maximum value within the first range MR1 (UC3). Specifically, the CPU 30 acquires a single line of gradation values GV by scanning the reference member BM while keeping the light source 21 turned on with the light quantity adjusted in the process UC2. The CPU 30 acquires the maximum one of gradation values GV within the first range MR1 among the acquired single line of gradation values GV.

The CPU 30 calculates a first maximum-minimum difference value MXMNdif1 (UC4). Specifically, the CPU 30 calculates the first maximum-minimum difference value MXMNdif1 by subtracting, from the upper limit (i.e., 255) of the 8-bit gradation data, the maximum gradation value GV acquired in the process UC3.

The CPU 30 reduces the quantity of light from the light source 21 by one level, and acquires a single line of gradation values GV (UC5). Specifically, the CPU 21 keeps the light source 21 turned on during the lighting period of time shortened by one level. The CPU 30 acquires a gradation value GV of each pixel included in the single line by scanning the reference member BM while keeping the light source 21 turned on with the light quantity reduced by one level. Thus, in the illustrative embodiment, the light quantity may be reduced by one level by shortening the lighting period of time for keeping the light source 21 turned on, without changing the electrical current supplied to the light source 21.

The CPU 30 acquires a minimum value within the second range MR2 (UC6). Specifically, the CPU 30 acquires the minimum one of gradation values GV within the second range MR2 among the single line of gradation values GV acquired in the process UC5.

The CPU 30 acquires a maximum value within the first range MR1 (UC7). Specifically, the CPU 30 acquires the maximum one of gradation values GV within the first range MR1 among the single line of gradation values GV acquired in the process UC5.

The CPU 30 calculates a second maximum-minimum difference value MXMNdif2 (UC8). Specifically, the CPU 30 calculates the second maximum-minimum difference value MXMNdif2 by subtracting the maximum gradation value GV acquired in the process UC7 from the minimum gradation value GV acquired in the process UC6.

The CPU 30 determines whether the second maximum-minimum difference value MXMNdif2 is more than the first maximum-minimum difference value MXMNdif1 (UC9). When determining that the second maximum-minimum difference value MXMNdif2 is equal to or less than the first maximum-minimum difference value MXMNdif1 (UC9: No), the CPU 30 goes to a process UC11. Meanwhile, when determining that the second maximum-minimum difference value MXMNdif2 is more than the first maximum-minimum difference value MXMNdif1 (UC9: Yes), the CPU 30 goes to a process UC10.

Specifically, when the second maximum-minimum difference value MXMNdif2 is more than the first maximum-minimum difference value MXMNdif1 (UC9: Yes), the CPU 30 stores, into the RAM 32, the second maximum-minimum difference value MXMNdif2 as a first maximum-minimum difference value MXMNdif1 (UC10). After completion of the process UC10, the CPU 30 goes to the process UC5.

When the second maximum-minimum difference value MXMNdif2 is equal to or less than the first maximum-minimum difference value MXMNdif1 (UC9: No), the CPU 30 acquires, as a detection light quantity DI, the light quantity reduced by one level in the process UC5 (UC11). In the illustrative embodiment, the detection light quantity DI is determined by the electrical current supplied to the light source 21 and the lighting period of time during which the light source 21 is kept turned on, and may be determined by the maximum electrical current and the lighting period of time finally determined in the process UC5. After completion of the process UC11, the CPU 30 terminates the detection light quantity adjusting process (U10 or D6).

(Threshold Calculating Process)

Figure 9:
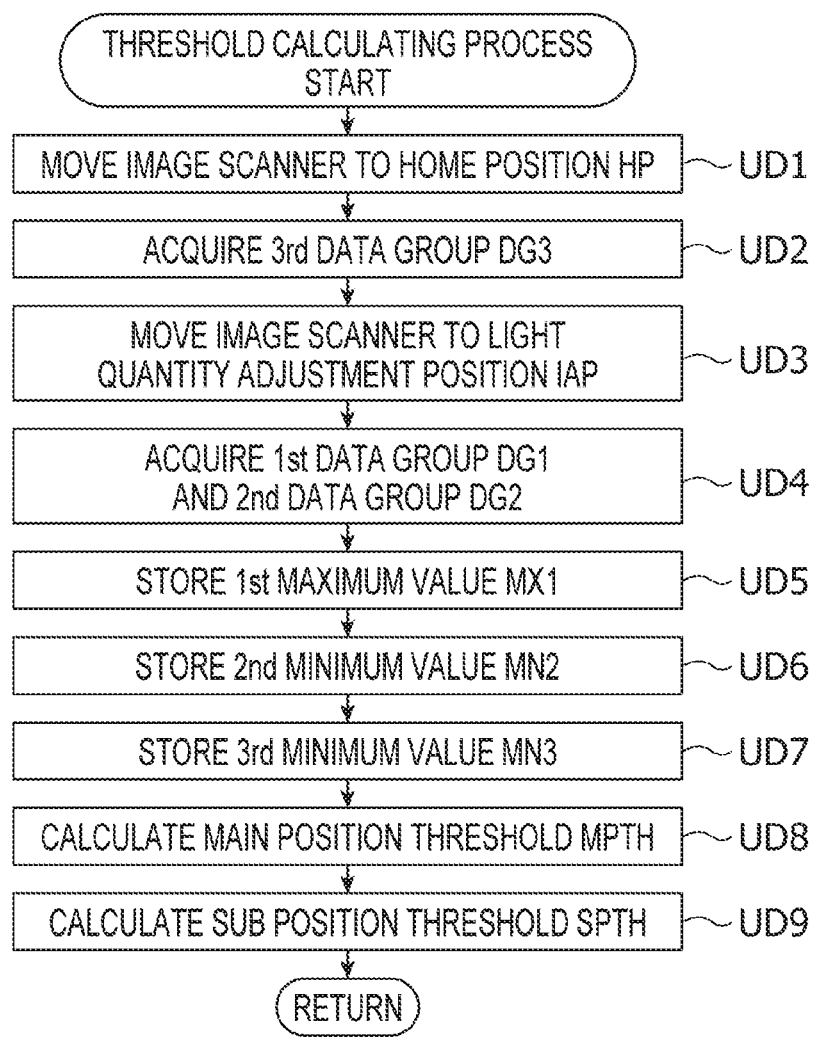
FIG. 9 is a flowchart showing a procedure of a threshold calculating process in the illustrative embodiment according to one or more aspects of the present disclosure.

When the threshold calculating process U12 (see FIG. 9) is started, the CPU 30 moves the image scanner 20 to the home position HP (UD1). Specifically, the CPU 30 transmits, to the drive circuit 37, a driving instruction to move the image scanner 20 to the home position HP.

The CPU 30 acquires a third data group DG3 of gradation values GV within the third storing area ME3 (UD2). Specifically, the CPU 30 transmits, to the drive circuit 37, a driving instruction to move the image scanner 20 to an upstream position that is located 20 lines upstream of the home position HP in the sub scanning direction. Then, the CPU 30 transmits, to the drive circuit 37, a driving instruction to move the image scanner 20 to a downstream position that is located 40 lines downstream of the upstream position in the sub scanning direction. Thereby, the CPU 30 acquires a gradation value GV of each pixel included in each line of 41 lines, by scanning the reference member BM on a line-by-line basis with the light source 21 kept turned on with the detection light quantity DI while moving the image scanner 20 to the downstream position. The CPU 30 acquires, as the third data group DG3, gradation values GV within the first range MR1 among the gradation values GV of the pixels included in the scanned 41 lines.

The CPU 30 moves the image scanner 20 to the light quantity adjustment position IAP (UD3). Specifically, the CPU 30 transmits, to the drive circuit 37, a driving instruction to move the image scanner 20 to the light quantity adjustment position IAP.

The CPU 30 acquires gradation values GV within the first storing area ME1 as a first data group DG1, and acquires gradation values GV within the second storing area ME2 as a second data group DG2 (UD4). Specifically, the CPU 30 transmits, to the drive circuit 37, a driving instruction to move the image scanner 20 to a specific upstream position that is located 20 lines upstream of the light quantity adjustment position IAP in the sub scanning direction. Then, the CPU 30 transmits, to the drive circuit 37, a driving instruction to move the image scanner 20 to a specific downstream position that is located 40 lines downstream of the specific upstream position in the sub scanning direction. Thereby, the CPU 30 acquires a gradation value GV of each pixel included in each line of 41 lines, by scanning the reference member BM on a line-by-line basis with the light source 21 kept turned on with the detection light quantity DI while moving the image scanner 20 to the specific downstream position. The CPU 30 acquires, as the first data group DG1, gradation values GV within the first range MR1 among the gradation values GV of the pixels included in the scanned 41 lines. Further, the CPU 30 acquires, as the second data group DG2, gradation values GV within the second range MR2 among the gradation values GV of the pixels included in the scanned 41 lines.

The CPU 30 stores the first maximum value MX1 into the flash ROM 33 (UD5). Specifically, the CPU 30 stores, into the flash ROM 33, a maximum one of the gradation values GV included in the first data group DG1, as the first maximum value MX1.

The CPU 30 stores the second minimum value MN2 into the flash ROM 33 (UD6). Specifically, the CPU 30 stores, into the flash ROM 33, a minimum one of the gradation values GV included in the second data group DG2, as the second minimum value MN2.

The CPU 30 stores the third minimum value MN3 into the flash ROM 33 (UD7). Specifically, the CPU 30 stores, into the flash ROM 33, a minimum one of the gradation values GV included in the third data group DG3, as the third minimum value MN3.

The CPU 30 calculates the main position threshold MPTH (UD8). Specifically, the CPU 30 calculates the main position threshold MPTH by averaging the first maximum value MX1 and the second minimum value MN2.

The CPU 30 calculates the sub position threshold SPTH (UD9). Specifically, the CPU 30 calculates the sub position threshold SPTH by averaging the first maximum value MX1 and the third minimum value MN3. After completion of the process UD9, the CPU 30 terminates the threshold calculating process U12 and returns to the activating process.

(Shutdown Process)

The shutdown process (see FIG. 10) is started in response to a power button 50 of the operation mechanism OM being pressed while the image scanning apparatus SM is maintained powered on. Namely, the CPU 30 starts the shutdown process upon receipt of an instruction issued in response to the power button 50 being pressed.

The CPU 30 initializes the device controller 34 and the image processor 36 (D1). Specifically, the CPU 30 acquires, from the flash ROM 33, settings for the clock signal CLK and the serial-in signal SI that are suitable for a scanning resolution of 300 DPI in the main scanning direction and a scanning resolution of 300 DPI in the sub scanning direction. Then, the CPU 30 applies the acquired settings to the device controller 34. The CPU 30 acquires, from the flash ROM 33, the detection light quantity DI of the light source 21. Then, the CPU 30 applies the acquired detection light quantity DI to the device controller 34. The CPU 30 configures settings for the black correction into the image processor 36. The CPU 30 acquires black correction data from the flash ROM 33, and sets the acquired black correction data into the image processor 36.

The CPU 30 moves the image scanner 20 to the light quantity adjustment position IAP and acquires a single line of gradation values GV (D2). Specifically, the CPU 30 transmits, to the drive circuit 37, a driving instruction to move the image scanner 20 to the light quantity adjustment position IAP in the sub scanning direction. The CPU 30 acquires a gradation value GV of each pixel included in the single line by scanning the reference member BM while keeping the light source 21 turned on with the detection light quantity DI.

The CPU 30 calculates a first average AV1 (D3). Specifically, the CPU 30 calculates the first average AV1 by averaging all of the gradation values GV within the first range MR1 among the single line of gradation values GV acquired in the process D2.

The CPU 30 calculates a second average AV2 (D4). Specifically, the CPU 30 calculates the second average AV2 by averaging all of the gradation values GV within the second range MR2 among the single line of gradation values GV acquired in the process D2.

The CPU 30 determines whether the first average AV1 is less than the first threshold TH1 (D5). When determining that the first average AV1 is less than the first threshold TH1 (D5: Yes), the CPU 30 goes to a process D7. Meanwhile, when determining that the first average AV1 is not less than the first threshold TH1 (D5: No), the CPU 30 goes to a process D6.

The CPU 30 performs the detection light quantity adjusting process (D6). The detection light quantity adjusting process D6 has been described in detail above. A general outline of the process D6 will be provided here. The CPU 30 transmits, to the drive circuit 37, a driving instruction to move the image scanner 20 to the light quantity adjustment position IAP. The CPU 30 acquires, as the detection light quantity DI, a light quantity adjusted to maximize a value obtained by subtracting a maximum one of the gradation values GV within the first range MR1 from a minimum one of the gradation values GV within the second range MR2. The CPU 30 stores the acquired detection light quantity DI into the flash ROM 33.

The CPU 30 determines whether the second average AV2 is equal to or more than the second threshold TH2 (D7). When determining that the second average AV2 is not equal to or more than the second threshold TH2 (D7: No), the CPU 30 goes to a process D8. When determining that the second average AV2 is equal to or more than the second threshold TH2 (D7: Yes), the CPU 30 goes to a process D9.

The CPU 30 stores the first maximum value MX1 and the second minimum value MN2 (D8). The storing process D8 will be described in detail later. A general outline of the process D8 will be provided here. The CPU 30 transmits, to the drive circuit 37, a driving instruction to move the image scanner 20 to the light quantity adjustment position IAP. The CPU 30 acquires gradation values GV within the first storing area ME1 as the first data group DG1, and acquires gradation values GV within the second storing area ME2 as the second data group DG2. The CPU 30 stores, into the flash ROM 33, a maximum one of the gradation values GV included in the acquired first data group DG1, as the first maximum value MX1. Further, the CPU 30 stores, into the flash ROM 33, a minimum one of the gradation values GV included in the acquired second data group DG2, as the second maximum value MN2. After completion of the process D8, the CPU 30 turns off the image scanning apparatus SM (D9). After completion of the process D9, the shutdown process is terminated.

(Storing Process)

Figure 11:
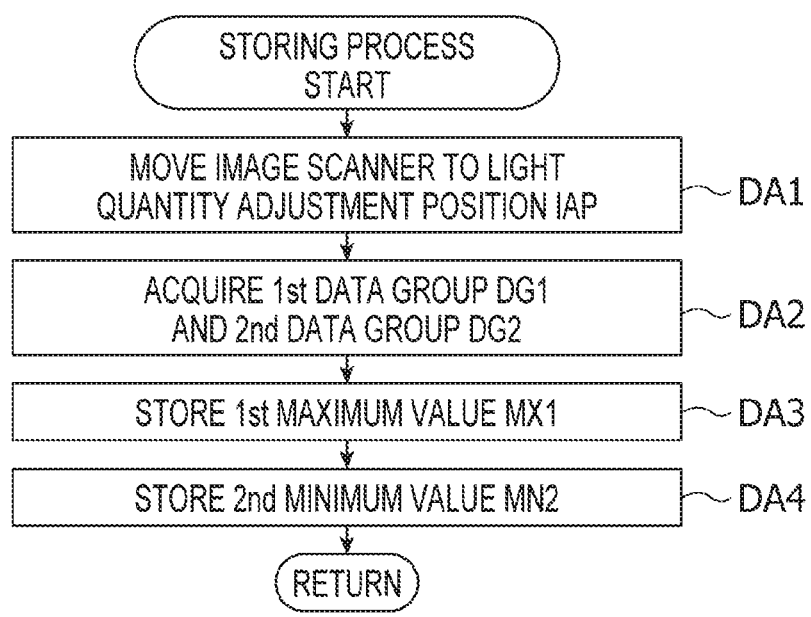
FIG. 11 is a flowchart showing a procedure of a storing process to store a first maximum value and a second minimum value, in the illustrative embodiment according to one or more aspects of the present disclosure.

When the storing process D8 (see FIG. 11) to store the first maximum value MX1 and the second minimum value MN2 is started, the CPU 30 moves the image scanner 20 to the light quantity adjustment position IAP (DA1). Specifically, the CPU 30 transmits, to the drive circuit 37, a driving instruction to move the image scanner 20 to the light quantity adjustment position IAP.

The CPU 30 acquires gradation values GV within the first storing area ME1 as the first data group DG1, and acquires gradation values GV within the second storing area ME2 as the second data group DG2 (DA2). Specifically, the CPU 30 transmits, to the drive circuit 37, a driving instruction to move the image scanner 20 to a specific upstream position that is located 20 lines upstream of the light quantity adjustment position IAP in the sub scanning direction. Then, the CPU 30 transmits, to the drive circuit 37, a driving instruction to move the image scanner 20 to a specific downstream position that is located 40 lines downstream of the specific upstream position in the sub scanning direction. Thereby, the CPU 30 acquires a gradation value GV of each pixel included in each line of 41 lines, by scanning the reference member BM on a line-by-line basis with the light source 21 kept turned on with the detection light quantity DI while moving the image scanner 20 to the specific downstream position. The CPU 30 acquires, as the first data group DG1, gradation values GV within the first range MR1 among the gradation values GV of the pixels included in the scanned 41 lines. Further, the CPU 30 acquires, as the second data group DG2, gradation values GV within the second range MR2 among the gradation values GV of the pixels included in the scanned 41 lines.

The CPU 30 stores the first maximum value MX1 into the flash ROM 33 (DA3). Specifically, the CPU 30 stores, into the flash ROM 33, a maximum one of the gradation values GV included in the first data group DG1 acquired in the process DA2, as the first maximum value MX1.

The CPU 30 stores the second minimum value MN2 into the flash ROM 33 (DA4). Specifically, the CPU 30 stores, into the flash ROM 33, a minimum one of the gradation values GV included in the second data group DG2 acquired in the process DA2, as the second minimum value MN2. After completion of the process DA4, the CPU 30 terminates the storing process D8.

Advantageous Effects in Illustrative Embodiment

In the illustrative embodiment, in the process U8, the CPU 30 determines whether the black average BAVE is less than the first threshold TH1. When determining that the black average BAVE is not less than the first threshold TH1

(i.e., when the black average BAVE is equal to or more than the first threshold TH1) (U8: No), the CPU 30 goes to the process U10. In the process U9, the CPU 30 determines whether the difference between the black-white difference value BWdif and the position threshold PTH is equal to or more than the third threshold TH3. When determining that the difference between the black-white difference value BWdif and the position threshold PTH is not equal to or more than the third threshold TH3 (i.e., when the difference between the black-white difference value BWdif and the position threshold PTH is less than the third threshold TH3) (U9: No), the CPU 30 goes to the process U10. In the process U10, the CPU 30 moves the image scanner 20 to the light quantity adjustment position IAP. Then, the CPU 30 acquires, the detection light quantity DI, a light quantity adjusted to maximize a value obtained by subtracting a maximum one of the gradation values GV included in the first range MR1 from a minimum one of the gradation values GV included in the second range MR2. The CPU 30 stores the acquired detection light quantity DI into the flash ROM 33. Hence, when the black average BAVE, which is an average of gradation values GV acquired by scanning the black area BE, is not less than the first threshold TH1, the black average BAVE may become higher due to color degradation of the black area BE. Even in such a case, by adjusting the detection light quantity DI for detecting the reference member BM, it is possible to accurately detect the reference member BM. Further, when the difference between the black-white difference value BWdif and the position threshold PTH is less than the third threshold TH3, such a secular change that the white average WAVE decreases due to aging of the light source 21 and such a secular change that the black average BAVE increases due to color degradation of the black area BE may concurrently occur. Even in this case, by adjusting the detection light quantity DI for detecting the reference member BM, it is possible to accurately detect the reference member BM.

In the process U11, the CPU 30 determines whether the white average WAVE is equal to or more than the second threshold TH2. When determining that the white average WAVE is not equal to or more than the second threshold TH2 (i.e., when the white average WAVE is less the second threshold TH2) (U11: No), the CPU 30 goes to the process U12. In response to completion of the process U10 or the negative determination (U11: No) in the process U11, the CPU 30 calculates the main position threshold MPTH and the sub position threshold SPTH in the process U12. Hence, when the white average WAVE is not equal to or more than the second threshold TH2, the white average WAVE may become lower due to a secular change of the light source 21. Even in such a case, by calculating the main position MPTH and the sub position threshold SPTH, it is possible to accurately detect the reference member BM. Further, in the illustrative embodiment, after adjusting the detection light quantity DI in the process U10, the CPU 30 acquires the first data group DG, the second data group DG2, and the third data group DG3, using the adjusted detection light quantity DI. Thereby, it is possible to accurately detect the reference member BM.

In the shutdown process, the CPU 30 determines in the process D5 whether the first average AV1 is less than the first threshold TH1. When determining that the first average AV1 is not less than the first threshold TH1 (i.e., when the first average AV1 is equal to or more than the first threshold TH1) (D5: No), the CPU 30 goes to the process D6. In the process D6, the CPU 30 moves the image scanner 20 to the light quantity adjustment position IAP. Further, the CPU 30 acquires, as the detection light quantity DI, a light quantity adjusted to maximize a value obtained by subtracting a maximum one of the gradation values GV within the first range MR1 from a minimum one of the gradation values GV within the second range MR2. The CPU 30 stores the acquired detection light quantity DI into the flash ROM 33. Hence, when the first average AV1, which is an average of gradation values GV acquired by scanning the black area BE, is not less than the first threshold TH1, the first average AV1 may become higher due to color degradation of the black area BE. Even in such a case, by adjusting the detection light quantity DI for detecting the reference member BM, it is possible to accurately detect the reference member BM. Further, by adjusting the detection light quantity DI in the shutdown process, it is possible to accurately detect the reference member BM next time the image scanning apparatus SM is powered on.

In the shutdown process, the CPU 30 determines in the process D7 whether the second average AV2 is equal to or more than the second threshold TH2. When determining that the second average AV2 is not equal to or more than the second threshold TH2 (i.e., when the second average AV2 is less than the second threshold TH2) (D7: No), the CPU 30 goes to the process D8. In the process D8, the CPU 30 stores the first maximum value MX1 and the second minimum value MN2 into the flash ROM 33. Hence, when the second average AV2 is not equal to or more than the second threshold TH2, the second average AV2 may become lower due to a secular change of the light source 21. Even in such a case, by storing the first maximum value MX1 and the second minimum value MN2 into the flash ROM 33, it is possible to, next time the image scanning apparatus SM is powered on, accurately calculate the position threshold PTH and thereby accurately detect the reference member BM.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

The image scanning apparatus SM according to aspects of the present disclosure may be applied to a multi-function peripheral including a printer. In the aforementioned illustrative embodiment, the image scanner 20 including the CIS has been exemplified. Nonetheless, the image scanner 20 may include a CCD unit configured to move along the sub scanning direction with a CCD mounted thereon, or may include a scanning unit having an image sensor configured such that only a light source and a mirror are movable along the sub scanning direction.

In the aforementioned illustrative embodiment, the black area BE is disposed at a position that is a most downstream position of the reference member BM in the sub scanning direction and is a most upstream position of the reference member BM in the main scanning direction. Nonetheless, the black area BE may be disposed at a different position. Further, in the aforementioned illustrative embodiment, the black area BE is formed in a rectangular shape. Nonetheless, the black area BE may be formed in a different shape (e.g., a round shape, an oval shape, and a polygonal shape other than the rectangular shape). Moreover, in the aforementioned illustrative embodiment, the number of the black area(s) BE is one. Nonetheless, two or more black areas BE may be provided.

In the aforementioned illustrative embodiment, the quantity of light emitted by the light source 21 is adjusted by the lighting period of time during which the light source 21 is kept turned on. Nonetheless, the light quantity of the light source 21 may be adjusted by the electrical current to be supplied to the light source 21, or may be adjusted by both the lighting period of time and the electrical current.

In the aforementioned illustrative embodiment, the first threshold TH1 is set to 30, which is a maximum value of varying gradation values GV acquired by single-line scanning of the black color along the main scanning direction. Nonetheless, the first threshold TH1 may be set to a different value such as an average of varying gradation values GV acquired by single-line scanning of the black color along the main scanning direction. Further, since gradation values GV acquired by scanning of the black color vary depending on an environmental temperature, the first threshold TH1 may be set to a higher value as the environmental temperature increases and may be set to a lower value as the environmental temperature decreases.

In the aforementioned illustrative embodiment, the second threshold TH2 is set to 127, which is an integer part of 255 (i.e., the upper limit of the 8-bit gradation data) divided by 2. Nonetheless, the second threshold TH2 may be set to a different value. For instance, gradation values GV acquired by scanning of the white color are significantly influenced by unevenness of the light quantity of the light source 21. Further, the unevenness of the light quantity of the light source 21 differs depending on an individual difference of the image scanner 20. Therefore, the second threshold TH2 may be individually set according to the unevenness of the light quantity of the light source 21 before shipment of the image scanning apparatus SM.

In the aforementioned illustrative embodiment, the third threshold TH3 is set to 25, which is about 10% of 255 (i.e., the upper limit of the 8-bit gradation data). Nonetheless, the third threshold TH3 may be set to a different value. For instance, when it is previously known that the image scanning apparatus SM will not be used for a long time, the CPU 30 might fail to detect the reference member BM. In this case, the third threshold TH3 may be set to a lower value, and preferably, the detection light quantity DI, the first maximum value MX1, and the second minimum value MN2 may be reacquired.

In the aforementioned illustrative embodiment, in the process UB6, the CPU 30 calculates the black average BAVE and the white average WAVE from a single line of gradation values GV acquired in a position to which the image scanner 20 is moved over a distance of 8 lines upstream in the sub scanning direction from a position where it is determined in the process UB4 that the first range MR1 is black and that the second range MR2 is white. Nonetheless, the CPU 30 may calculate the black average BAVE and the white average WAVE from a single line of gradation values GV acquired in a different position. For instance, the CPU 30 may calculate the black average BAVE and the white average WAVE from a single line of gradation values GV acquired in any position between a $30^{th}$-line position and a $90^{th}$-line position that are downstream of the home position HP in the sub scanning direction.

In the aforementioned illustrative embodiment, the CPU 30 determines whether to perform the detection light quantity adjusting process, by determining whether the black average BAVE is less than the first threshold TH1. Nonetheless, the CPU 30 may determine whether to perform the detection light quantity adjusting process, in a different method. For instance, the CPU may perform the detection light quantity adjusting process when the black average BAVE greatly changes.

In the aforementioned illustrative embodiment, in the process UD8, the CPU 30 calculates the main position threshold MPTH by averaging the first maximum value MX1 and the second minimum value MN2. Nonetheless, the CPU 30 may calculate the main position threshold MPTH in a different method. For instance, the CPU 30 may determine the main position threshold MPTH as an intermediate value between the first maximum value MX1 and the second minimum value MN2.

In the aforementioned illustrative embodiment, in the process UD9, the CPU 30 calculates the sub position threshold SPTH by averaging the first maximum value MX1 and the third minimum value MN3. Nonetheless, the CPU 30 may calculate the sub position threshold SPTH in a different method. For instance, the CPU 30 may determine the sub position threshold SPTH as an intermediate value between the first maximum value MX1 and the third minimum value MN3.

Associations between elements exemplified in the aforementioned illustrative embodiment and elements according to aspects of the present disclosure will be exemplified below. The image scanning apparatus SM may be an example of an "image scanning apparatus" according to aspects of the present disclosure. The reference member BM may be an example of a "reference member" according to aspects of the present disclosure. The image scanner 20, the AFE 35, and the image processor 36 may be included in an "image scanner" according to aspects of the present disclosure. The drive circuit 37, the carrying motor MT, and the moving mechanism MM may be included in a "mover" according to aspects of the present disclosure. The RAM 32 and the flash ROM 33 may be included in a "storage" according to aspects of the present disclosure. The CPU 30 and the ROM 31 storing the programs 31A may be included in a "controller" according to aspects of the present disclosure. Each of the processes U8, U9, and D5 may be an example of a "light quantity adjustment determining process" according to aspects of the present disclosure. Each of the processes U10 and D6 may be an example of a "light quantity adjusting process" according to aspects of the present disclosure. The process U12 may be an example of a "threshold calculating process" according to aspects of the present disclosure. Each of the processes U3, U6, and U13 may be an example of a "reference position detecting process" according to aspects of the present disclosure. The processes UD4 and UD5 may be included in an exemplary procedure of a "black value acquiring process" according to aspects of the present disclosure. Further, the processes DA2 and DA3 may be included in an exemplary procedure of the "black value acquiring process" according to aspects of the present disclosure. The processes UD4, UD6, and UD7 may be included in an exemplary procedure of a "white value acquiring process" according to aspects of the present disclosure. Further, the processes DA2 and DA4 may be included in an exemplary procedure of the "white value acquiring process" according to aspects of the present disclosure. Each of the processes U11 and D7 may be an example of a "reacquisition determining process" according to aspects of the present disclosure. The process UB6 may be an example of a "black average acquiring process" according to aspects of the present disclosure. Further, the processes D2 and D3 may be included in an exemplary procedure of the "black average acquiring process" according to aspects of the present disclosure. Each of the processes U8 and D5 may be an example of a "black determining process" according to aspects of the present disclosure. The process UB6 may be an example of a "white average acquiring process" according to aspects of the present disclosure. Further, the processes D2 and D4 may be included in an exemplary procedure of the "white average acquiring process" according to aspects of the present disclosure. Each of the processes U11 and D7 may be an example of a "white determining process" according to aspects of the present disclosure. The process U2 may be an example of a "pre-adjustment threshold calculating process" according to aspects of the present disclosure. The process UB7 may be an example of a "black-white difference calculating process" according to aspects of the present disclosure. The process U9 may be an example of a "black-white difference determining process" according to aspects of the present disclosure. The shutdown process shown in FIG. 10 may be an example of a "shutdown process" according to aspects of the present disclosure.

What is claimed is:

1. An image scanning apparatus comprising:
   an image scanner comprising a light source and a light receiver, the light receiver comprising light receiving elements arranged in line along a main scanning direction, the image scanner being configured to illuminate a scanned target with light emitted by the light source and receive reflected light from the scanned target by the light receiver, thereby generating gradation values;
   a mover configured to move the image scanner along a sub scanning direction perpendicular to the main scanning direction;
   a reference member comprising a first-color portion, a second-color portion, and boundaries between the first-color portion and the second-color portion in the main scanning direction and the sub scanning direction; and
   a controller configured to perform:
      a light quantity adjustment determining process to determine whether a detection light quantity needs to be adjusted, based on adjustment determination values, the detection light quantity being a quantity of light to be emitted by the light source to detect the boundaries of the reference member, the adjustment determination values being gradation values generated when the image scanner illuminates the reference member with the detection light quantity in a reference-member detectable position, the reference-member detectable position being a position in the sub scanning direction where the image scanner faces the first-color portion and the second-color portion;
      a light quantity adjusting process to,
      in response to determining that the detection light quantity needs to be adjusted, adjust the detection light quantity to maximize a difference between a gradation value generated when the image scanner scans the second-color portion while illuminating the reference member in the reference-member detectable position and a gradation value generated when the image scanner scans the first-color portion while illuminating the reference member in the reference-member detectable position;
      a threshold calculating process to calculate a detection threshold based on a first-color value and a second-color value, the first-color value being a gradation value generated when the image scanner scans the first-color portion with the adjusted detection light quantity, the second-color value being a gradation value generated when the image scanner scans the second-color portion with the adjusted detection light quantity; and
      a boundary detecting process to, while moving the image scanner along the sub scanning direction by the mover, detect the boundaries in the main scanning direction and the sub scanning direction by comparing, with the detection threshold, gradation values generated when the image scanner scans the reference member while illuminating the reference member with the adjusted detection light quantity.

2. The image scanning apparatus according to claim 1, further comprising a storage configured to store the detection light quantity,
   wherein the controller is further configured to perform:
      the light quantity adjusting process comprising:
         when adjusting the detection light quantity in response to determining that the detection light quantity needs to be adjusted, storing the adjusted detection light quantity into the storage, thereby updating the detection light quantity stored in the storage;
      the threshold calculating process to calculate the detection threshold based on the first-color value and the second-color value, the first-color value being a gradation value generated when the image scanner scans the first-color portion with the detection light quantity stored in the storage, the second-color value being a gradation value generated when the image scanner scans the second-color portion with the detection light quantity stored in the storage;
      the boundary detecting process to, while moving the image scanner along the sub scanning direction by the mover, detect the boundaries in the main scanning direction and the sub scanning direction by comparing, with the detection threshold, gradation values generated when the image scanner scans the reference member while illuminating the reference member with the detection light quantity stored in the storage; and
      a reference position determining process to determine a reference position for image scanning by the image scanner, based on the detected boundaries between the first-color portion and the second-color portion in the main scanning direction and the sub scanning direction.

3. The image scanning apparatus according to claim 2, wherein the storage is further configured to store the black value and the white value, and
   wherein the threshold calculating process comprises:
      a first-color value acquiring process comprising:
         after adjusting the detection light quantity in response to determining that the detection light quantity needs to be adjusted, acquiring, as the first-color value, a maximum one of gradation values within a particular first-color area of the first-color portion among gradation values generated when the image scanner scans the first-color portion while illuminating the reference member with the adjusted detection light quantity; and
storing the acquired black value into the storage;
a second-color value acquiring process comprising:
after adjusting the detection light quantity in response to determining that the detection light quantity needs to be adjusted, acquiring, as the second-color value, a minimum one of gradation values within a particular second-color area of the second-color portion among gradation values generated when the image scanner scans the second-color portion while illuminating the reference member with the adjusted detection light quantity; and
storing the acquired white value into the storage; and
calculating, as the detection threshold, an average of the first-color value stored in the storage and the second-color value stored in the storage.

4. The image scanning apparatus according to claim 3, wherein the controller is further configured to perform:
a reacquisition determining process to, in response to determining that the detection light quantity does not need to be adjusted, determine whether the first-color value and the second-color value need to be acquired, based on a reacquisition determination value, the reacquisition determination value being a gradation value generated when the image scanner scans the reference member while illuminating the reference member with the detection light quantity stored in the storage, in the reference-member detectable position,
wherein the first-color value acquiring process comprises:
in response to determining that the first-color value and the second-color value need to be acquired, acquiring, as the first-color value, a maximum one of gradation values within the particular first-color area of the first-color portion among gradation values generated when the image scanner scans the first-color portion while illuminating the reference member with the detection light quantity stored in the storage; and
storing the acquired first-color value into the storage, and
wherein the second-color value acquiring process comprises:
in response to determining that the first-color value and the second-color value need to be acquired, acquiring, as the second-color value, a minimum one of gradation values within the particular second-color area of the second-color portion among gradation values generated when the image scanner scans the second-color portion while illuminating the reference member with the detection light quantity stored in the storage; and
storing the acquired second-color value into the storage.

5. The image scanning apparatus according to claim 4, wherein the light quantity adjustment determining process comprises:
a first-color average acquiring process comprising:
acquiring a first-color average as one of the adjustment determination values, the first-color average being an average of gradation values within a first range among a single line of gradation values generated when the image scanner scans the reference member along the main scanning direction in the reference-member detectable position, the first range corresponding to a position of the first-color portion in the main scanning direction; and
storing the acquired first-color average into the storage;
a first-color determining process to determine whether the first-color average is less than a first threshold, the first threshold being a maximum one of varying gradation values generated when the image scanner performs single-line scanning of a first-color color along the main scanning direction; and
in response to determining that the first-color average is equal to or more than the first threshold, determining that the detection light quantity needs to be adjusted; and
in response to determining that the first-color average is less than the first threshold, determining that the detection light quantity does not need to be adjusted.

6. The image scanning apparatus according to claim 5, wherein the reacquisition determining process comprises:
a second-color average acquiring process comprising:
acquiring a second-color average as the reacquisition determination value, the second-color average being an average of gradation values within a second range among a single line of gradation values generated when the image scanner scans the reference member along the main scanning direction in the reference-member detectable position, the second range corresponding to a position of the second-color portion in the main scanning direction; and
storing the acquired second-color average into the storage;
a second-color determining process to determine whether the reacquisition determination value is equal to or more than a second threshold, the second threshold being an integer part of a value obtained by dividing an upper limit of gradation values generable by the image scanner by two; and
in response to determining that the reacquisition determination value is less than the second threshold, determining that the first-color value and the second-color value need to be acquired; and
in response to determining that the reacquisition determination value is equal to or more than the second threshold, determining that the first-color value or the second-color value does not need to be acquired.

7. The image scanning apparatus according to claim 6, wherein the controller is further configured to perform:
a pre-adjustment threshold calculating process to, before execution of the light quantity adjustment determining process, calculate, as a pre-adjustment detection threshold, an average of the first-color color and the second-color color stored in the storage,
wherein the light quantity adjustment determining process comprises:
a difference calculating process comprising:
calculating, as one of the adjustment determination values, a difference value by subtracting the first-color average from the second-color average; and
storing the calculated difference value into the storage;

a difference determining process to determine whether a difference between the difference value and the pre-adjustment detection threshold is equal to or more than a third threshold, the third threshold being substantially 10% of a count of gradations for the gradation values generable by the image scanner;

in response to determining that the difference between the difference value and the pre-adjustment detection threshold is less than the third threshold, determining that the detection light quantity needs to be adjusted; and in response to determining that the difference between the difference value and the pre-adjustment detection threshold is equal to or more than the third threshold, determining that the detection light quantity does not need to be adjusted.

8. The image scanning apparatus according to claim 7, further comprising an operable power switch, wherein the controller is further configured to perform:

a shutdown process to, in response to the power switch being operated, after execution of the light quantity adjustment determining process, the reacquisition determining process, the light quantity adjusting process, and the threshold calculating process, power off the image scanning apparatus.

9. The image scanning apparatus according to claim 1, wherein the controller comprises:

a processor; and a memory storing processor-executable instructions configured to, when executed by the processor, cause the processor to perform the light quantity adjustment determining process, the light quantity adjusting process, the threshold calculating process, and the boundary detecting process.

10. The image scanning apparatus according to claim 1, wherein the first-color portion is a black portion, and wherein the second-color portion is a white portion.

11. A method implementable on a processor coupled with an image scanning apparatus, the image scanning apparatus comprising:

an image scanner comprising a light source and a light receiver, the light receiver comprising light receiving elements arranged in line along a main scanning direction, the image scanner being configured to illuminate a scanned target with light emitted by the light source and receive reflected light from the scanned target by the light receiver, thereby generating gradation values;

a mover configured to move the image scanner along a sub scanning direction perpendicular to the main scanning direction; and a reference member comprising a first-color portion, a second-color portion, and boundaries between the first-color portion and the second-color portion in the main scanning direction and the sub scanning direction, the method comprising:

determining whether a detection light quantity needs to be adjusted, based on adjustment determination values, the detection light quantity being a quantity of light to be emitted by the light source to detect the boundaries of the reference member, the adjustment determination values being gradation values generated when the image scanner illuminates the reference member with the detection light quantity in a reference-member detectable position, the reference-member detectable position being a position in the sub scanning direction where the image scanner faces the first-color portion and the second-color portion;

in response to determining that the detection light quantity needs to be adjusted, adjusting the detection light quantity to maximize a difference between a gradation value generated when the image scanner scans the second-color portion while illuminating the reference member in the reference-member detectable position and a gradation value generated when the image scanner scans the first-color portion while illuminating the reference member in the reference-member detectable position;

calculating a detection threshold based on a first-color value and a second-color value, the first-color value being a gradation value generated when the image scanner scans the first-color portion with the adjusted detection light quantity, the second-color value being a gradation value generated when the image scanner scans the second-color portion with the adjusted detection light quantity; and while moving the image scanner along the sub scanning direction by the mover, detecting the boundaries in the main scanning direction and the sub scanning direction by comparing, with the detection threshold, gradation values generated when the image scanner scans the reference member while illuminating the reference member with the adjusted detection light quantity.

12. A non-transitory computer-readable medium storing computer-readable instructions that are executable by a processor coupled with an image scanning apparatus, the image scanning apparatus comprising:

an image scanner comprising a light source and a light receiver, the light receiver comprising light receiving elements arranged in line along a main scanning direction, the image scanner being configured to illuminate a scanned target with light emitted by the light source and receive reflected light from the scanned target by the light receiver, thereby generating gradation values;

a mover configured to move the image scanner along a sub scanning direction perpendicular to the main scanning direction; and a reference member comprising a first-color portion, a second-color portion, and a boundaries between the first-color portion and the second-color portion in the main scanning direction and the sub scanning direction, the instructions being configured to, when executed by the processor, cause the processor to perform:

a light quantity adjustment determining process to determine whether a detection light quantity needs to be adjusted, based on adjustment determination values, the detection light quantity being a quantity of light to be emitted by the light source to detect the boundaries of the reference member, the adjustment determination values being gradation values generated when the image scanner illuminates the reference member with the detection light quantity in a reference-member detectable position, the reference-member detectable position being a position in the sub scanning direction where the image scanner faces the first-color portion and the second-color portion;

a light quantity adjusting process to, in response to determining that the detection light quantity needs to be adjusted, adjust the detection light quantity to maximize a difference between a gradation value generated when the image scanner scans the second-color portion while illuminating the reference member in the reference-member detectable position and a gradation value generated when the image scanner scans the first-color portion while illuminating the reference member in the reference-member detectable position;

a threshold calculating process to calculate a detection threshold based on a first-color value and a second-color value, the first-color value being a gradation value generated when the image scanner scans the first-color portion with the adjusted detection light quantity, the second-color value being a gradation value generated when the image scanner scans the second-color portion with the adjusted detection light quantity; and a boundary detecting process to, while moving the image scanner along the sub scanning direction by the mover, detect the boundaries in the main scanning direction and the sub scanning direction by comparing, with the detection threshold, gradation values generated when the image scanner scans the reference member while illuminating the reference member with the adjusted detection light quantity.

13. The non-transitory computer-readable medium according to claim 12, wherein the image scanning apparatus further comprises a storage configured to store the detection light quantity, and wherein the instructions are further configured to, when executed by the processor, cause the processor to perform:

the light quantity adjusting process comprising:
when adjusting the detection light quantity in response to determining that the detection light quantity needs to be adjusted, storing the adjusted detection light quantity into the storage, thereby updating the detection light quantity stored in the storage;

the threshold calculating process to calculate the detection threshold based on the first-color value and the second-color value, the first-color value being a gradation value generated when the image scanner scans the first-color portion with the detection light quantity stored in the storage, the second-color value being a gradation value generated when the image scanner scans the second-color portion with the detection light quantity stored in the storage;

the boundary detecting process to, while moving the image scanner along the sub scanning direction by the mover, detect the boundaries in the main scanning direction and the sub scanning direction by comparing, with the detection threshold, gradation values generated when the image scanner scans the reference member while illuminating the reference member with the detection light quantity stored in the storage; and a reference position determining process to determine a reference position for image scanning by the image scanner, based on the detected boundaries between the first-color portion and the second-color portion in the main scanning direction and the sub scanning direction.

14. The non-transitory computer-readable medium according to claim 13, wherein the storage is further configured to store the black value and the white value, and wherein the threshold calculating process comprises:
a first-color value acquiring process comprising:
after adjusting the detection light quantity in response to determining that the detection light quantity needs to be adjusted, acquiring, as the first-color value, a maximum one of gradation values within a particular first-color area of the first-color portion among gradation values generated when the image scanner scans the first-color portion while illuminating the reference member with the adjusted detection light quantity; and storing the acquired black value into the storage;

a second-color value acquiring process comprising:
after adjusting the detection light quantity in response to determining that the detection light quantity needs to be adjusted, acquiring, as the second-color value, a minimum one of gradation values within a particular second-color area of the second-color portion among gradation values generated when the image scanner scans the second-color portion while illuminating the reference member with the adjusted detection light quantity; and storing the acquired white value into the storage; and calculating, as the detection threshold, an average of the first-color value stored in the storage and the second-color value stored in the storage.

15. The non-transitory computer-readable medium according to claim 14, wherein the instructions are further configured to, when executed by the processor, cause the processor to perform:

a reacquisition determining process to, in response to determining that the detection light quantity does not need to be adjusted, determine whether the first-color value and the second-color value need to be acquired, based on a reacquisition determination value, the reacquisition determination value being a gradation value generated when the image scanner scans the reference member while illuminating the reference member with the detection light quantity stored in the storage, in the reference-member detectable position, wherein the first-color value acquiring process comprises:
in response to determining that the first-color value and the second-color value need to be acquired, acquiring, as the first-color value, a maximum one of gradation values within the particular first-color area of the first-color portion among gradation values generated when the image scanner scans the first-color portion while illuminating the reference member with the detection light quantity stored in the storage; and storing the acquired first-color value into the storage, and wherein the second-color value acquiring process comprises:
in response to determining that the first-color value and the second-color value need to be acquired, acquiring, as the second-color value, a minimum one of gradation values within the particular second-color area of the second-color portion among gradation values generated when the image scanner scans the second-color portion while illuminating the reference member with the detection light quantity stored in the storage; and storing the acquired second-color value into the storage.

16. The non-transitory computer-readable medium according to claim 15, wherein the light quantity adjustment determining process comprises:

a first-color average acquiring process comprising:
   acquiring a first-color average as one of the adjustment determination values, the first-color average being an average of gradation values within a first range among a single line of gradation values generated when the image scanner scans the reference member along the main scanning direction in the reference-member detectable position, the first range corresponding to a position of the first-color portion in the main scanning direction; and
   storing the acquired first-color average into the storage;
a first-color determining process to determine whether the first-color average is less than a first threshold, the first threshold being a maximum one of varying gradation values generated when the image scanner performs single-line scanning of a first-color color along the main scanning direction; and
in response to determining that the first-color average is equal to or more than the first threshold, determining that the detection light quantity needs to be adjusted; and
in response to determining that the first-color average is less than the first threshold, determining that the detection light quantity does not need to be adjusted.

17. The non-transitory computer-readable medium according to claim 16,
wherein the reacquisition determining process comprises:
   a second-color average acquiring process comprising:
      acquiring a second-color average as the reacquisition determination value, the second-color average being an average of gradation values within a second range among a single line of gradation values generated when the image scanner scans the reference member along the main scanning direction in the reference-member detectable position, the second range corresponding to a position of the second-color portion in the main scanning direction; and
      storing the acquired second-color average into the storage;
   a second-color determining process to determine whether the reacquisition determination value is equal to or more than a second threshold, the second threshold being an integer part of a value obtained by dividing an upper limit of gradation values generable by the image scanner by two; and
   in response to determining that the reacquisition determination value is less than the second threshold, determining that the first-color value and the second-color value need to be acquired; and
   in response to determining that the reacquisition determination value is equal to or more than the second threshold, determining that the first-color value or the second-color value does not need to be acquired.

18. The non-transitory computer-readable medium according to claim 17,
wherein the instructions are further configured to, when executed by the processor, cause the processor to perform:
   a pre-adjustment threshold calculating process to, before execution of the light quantity adjustment determining process, calculate, as a pre-adjustment detection threshold, an average of the first-color color and the second-color color stored in the storage,
wherein the light quantity adjustment determining process comprises:
   a difference calculating process comprising:
      calculating, as one of the adjustment determination values, a difference value by subtracting the first-color average from the second-color average; and
      storing the calculated difference value into the storage;
   a difference determining process to determine whether a difference between the difference value and the pre-adjustment detection threshold is equal to or more than a third threshold, the third threshold being substantially 10% of a count of gradations for the gradation values generable by the image scanner;
   in response to determining that the difference between the difference value and the pre-adjustment detection threshold is less than the third threshold, determining that the detection light quantity needs to be adjusted; and
   in response to determining that the difference between the difference value and the pre-adjustment detection threshold is equal to or more than the third threshold, determining that the detection light quantity does not need to be adjusted.

19. The non-transitory computer-readable medium according to claim 18, further comprising an operable power switch,
wherein the instructions are further configured to, when executed by the processor, cause the processor to perform:
   a shutdown process to, in response to the power switch being operated, after execution of the light quantity adjustment determining process, the reacquisition determining process, the light quantity adjusting process, and the threshold calculating process, power off the image scanning apparatus.

20. The non-transitory computer-readable medium according to claim 12,
wherein the first-color portion is a black portion, and
wherein the second-color portion is a white portion.

* * * * *